United States Patent
Casparian et al.

(10) Patent No.: US 10,481,656 B2
(45) Date of Patent: Nov. 19, 2019

(54) SYSTEMS AND METHODS FOR COOLING PORTABLE INFORMATION HANDLING SYSTEMS

(71) Applicant: Dell Products LP, Round Rock, TX (US)

(72) Inventors: Mark A. Casparian, Miami, FL (US); Philip J. Grossmann, Austin, TX (US); Joe A. Olmsted, Cedar Park, TX (US); Francisco Santana, Miami, FL (US); Charles Cameron Duncan, Austin, TX (US); Frank C. Azor, Palmetto Bay, FL (US)

(73) Assignee: Dell Products L.P., Round Rock, TX (US)

( * ) Notice: Subject to any disclaimer, the term of this patent is extended or adjusted under 35 U.S.C. 154(b) by 254 days.

(21) Appl. No.: 14/965,186

(22) Filed: Dec. 10, 2015

(65) Prior Publication Data

US 2017/0168531 A1     Jun. 15, 2017

(51) Int. Cl.
*G06F 1/20*             (2006.01)

(52) U.S. Cl.
CPC .................................. *G06F 1/206* (2013.01)

(58) Field of Classification Search
USPC ......................................................... 710/304
See application file for complete search history.

(56) References Cited

U.S. PATENT DOCUMENTS

| | | |
|---|---|---|
| 5,798,951 A | 8/1998 | Cho et al. |
| 5,884,049 A | 3/1999 | Atkinson |
| 6,023,587 A | 2/2000 | Watts, Jr. et al. |
| 6,151,646 A | 11/2000 | Watts et al. |
| 6,522,535 B1 | 2/2003 | Helot et al. |
| 6,744,630 B2 | 6/2004 | Hutchinson et al. |
| 6,837,057 B2 | 1/2005 | Pokharna et al. |
| 6,845,008 B2 | 1/2005 | Pokharna et al. |

(Continued)

OTHER PUBLICATIONS

Cutress, "ASUS X99—A Motherboard Review" Dec. 22, 2014 (12 pgs), accessed at www.anandtech.com/show/7965/asus-z97-deluxe-nfc-wlc-review-thunderbolt-2/2 (Year: 2014).*

(Continued)

*Primary Examiner* — Emilio J Saavedra
(74) *Attorney, Agent, or Firm* — Egan Peterman Enders Huston

(57) ABSTRACT

Systems and methods that may be implemented using an external cooling dock that is configured to provide supplemental cooling to a portable information handling system by blowing sub-ambient temperature air into one or more existing external air intake-vents of the chassis of the portable information handling system. The external cooling dock may be further configured to electronically dock or otherwise mate in bidirectional signal communication with the portable information handing system to allow the cooling dock processing device to operate cooperatively in a closed loop with the internal processing device/s of the portable information handling system so as to control operation of the cooling dock components and/or the operation of the processing devices within the portable information handling system.

34 Claims, 8 Drawing Sheets

(56) References Cited

U.S. PATENT DOCUMENTS

| | | | |
|---|---|---|---|
| 7,788,436 B2* | 8/2010 | Mok | G06F 1/1632 165/80.3 |
| 8,320,121 B2 | 11/2012 | Bisson et al. | |
| 8,619,419 B2 | 12/2013 | Zimmermann et al. | |
| 9,025,332 B2 | 5/2015 | Campbell et al. | |
| 2003/0005201 A1* | 1/2003 | Olson | G06F 1/1632 710/303 |
| 2004/0123977 A1 | 7/2004 | Pokharna et al. | |
| 2006/0158844 A1 | 7/2006 | Lee | |
| 2009/0030644 A1* | 1/2009 | Johns | G01K 3/005 702/130 |
| 2010/0202627 A1* | 8/2010 | Gray | H01M 10/465 381/77 |
| 2011/0085303 A1 | 4/2011 | Peng et al. | |
| 2011/0267769 A1* | 11/2011 | Nakamura | G06F 1/1632 361/679.48 |
| 2012/0327581 A1* | 12/2012 | Pais | G06F 1/1632 361/679.26 |
| 2014/0032011 A1 | 1/2014 | Artman et al. | |
| 2014/0098486 A1* | 4/2014 | Davis | G06F 1/1607 361/679.41 |
| 2014/0281618 A1 | 9/2014 | Sultenfuss et al. | |
| 2015/0198957 A1 | 7/2015 | Montero et al. | |

OTHER PUBLICATIONS

Kirsch, "IDF—Hot Gaming Notebooks Get Air Conditioning" Sep. 19, 2007 (4 pgs), accessed at www.legitreviews.com/idf-hot-gaming-notebooks-get-air-conditioning_567 (Year: 2007).*

Grossman et al., "Systems and Methods for Controlling Processing Device Power Consumption" U.S. Appl. No. 14/836,618, filed Aug. 26, 2015, 32 pgs.

Lovicott et al, "Systems and Methods of Adaptive Thermal Control for Information Handling Systems", U.S. Appl. No. 14/664,317, filed Mar. 20, 2015, 56 pgs.

Sierra et al, "Systems and Methods for Orchestrating External Graphics", U.S. Appl. No. 14/523,547; filed Oct. 24, 2014, 67 pgs.

Prendergast et al. "Systems and Methods for Controlling Radio Transmit Power for Information Handling Systems Based on System Specific RF Parameters", U.S. Appl. No. 14/734,453, filed Jun. 9, 2015, 33 pgs.

* cited by examiner

| Description | Inputs | | Calculated factors used to generate Outputs | | | | | Outputs | | | | | | |
|---|---|---|---|---|---|---|---|---|---|---|---|---|---|---|
| | CPU % Utilization | dGPU % Utilization | Chilled Air Delta =(Room ambient temp-10 degF)-chilled air temp sensed | Safe Temp Range=(Max shared heatsink temp)-(shared heatsink temp) | Chiller failure test=(chilled air @ time 0+1) AND Peltier Voltage >8V and Peltier Current>2 Amps) | CPU Delta= CPU max temp-CPU temp | dGPU Delta= dGPU max temp-dGPU temp | Peltier Voltage Input | Peltier Current Input | Dock's Fan Duty Cycle(%) | CPU overclock level 1 | CPU overclock level 2 | dGPU overclock level 1 | dGPU overclock level 2 |
| A CPU intensive app is in effect (80-100% utilization). If CPU is in safe temp range (>4 deg from max heatsink temp), and chilled air temp Delta is between 0-9 deg, operate in CPU OC level 2 | 80-100% | | 0-9 deg | safe temp range>5 deg. | | >1 | | 11V | 6 amps | 80.00% | OFF | ON | | |
| A CPU intensive app is in effect (80-100% utilization). As safety temp range starts to decrease to within the 3-5 deg range, decrease the CPU OC performance from Level 2 to Level 1. | 80-100% | | 0-9 deg | 1<safe temp range<5 deg. | | >1 | | 11V | 6 amps | 100.00% | ON | OFF | | |
| A dGPU intensive app is in effect (80-100% utilization). If dGPU is in safe temp range (>5 deg from max heatsink temp), operate in dGPU OC level 2 | | 80-100% | 0-9 deg | safe temp range>5 deg. | | | >1 | 11V | 6 amps | 80.00% | | | | ON |
| A dGPU intensive app is in effect (80-100% utilization). As safety temp range starts to decrease to within the 3-5 deg range, decrease the dGPU OC performance from Level 2 to Level 1. | | 80-100% | 0-9 deg | 1<safe temp range<5 deg. | | | >1 | 11V | 6 amps | 100.00% | | | ON | OFF |
| If CPU% utilization is less than 80% at anytime, do not over clock CPU If dGPU% utilization is less than 80% at anytime, do not over clock dGPU | 0-79% | 0-79% | | | | | | | | | OFF | OFF | OFF | OFF |
| If safe temp range is between 5-10 deg. run Peltiers at max cooling and medium Dock fan speed | | | | 5<safe temp range<10 | | | | 11V | 6 amps | 80.00% | | | | |
| If safe temp range is greater than 10 deg. run Peltiers at medium setting and Dock fan speed at medium setting | | | | save temp range>10 | | | | 6V | 3 amps | 80.00% | | | | |
| If (safe temp range falls below 1 deg) OR (CPU Delta<=1) OR (dGPU Delta<=1 deg) then disable both CPU and dGPU over clocking and max out cooling and dock fan speed until safe temp range falls to 3 degrees. | | | | safe temp range<1 deg. | | <=1 | <=1 | 11V | 6 amps | 100.00% | OFF | OFF | OFF | OFF |
| Chiller has failed=Chiller is providing warmer air without command to do so. Turn off power to cooler, disable all Overclocking, but max out fan speed (as a safety). | | | | | TRUE | | | 0(turn off) | 0(turn off) | 100.00% | OFF | OFF | OFF | OFF |

*FIG. 4*

SYSTEMS AND METHODS FOR COOLING PORTABLE INFORMATION HANDLING SYSTEMS

FIELD OF THE INVENTION

This application relates to portable information handling systems and, more particularly, to cooling for portable information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Notebook computers include a host central processing unit (CPU) to perform processing tasks for the system including executing various applications such as computer games. A notebook computer may also include internal graphics processing unit (GPUs) in the form of a lower performance internal integrated GPU (iGPU), and a higher performance internal discrete GPU (dGPU). The internal iGPU is integrated within the host central processing unit (CPU) inside the notebook computer chassis enclosure, and the internal discrete GPU is provided inside the enclosure of a notebook computer chassis and coupled to the host CPU using an internal data bus. The host CPU and dGPU typically share the same notebook heat sink and fan cooling resources that are located within the same notebook computer chassis.

Some notebook computer CPUs are configured to operate at multiple configurable power levels by controlling processor clock speed. These power levels include a power level 1 (OEM PL1) that specifies maximum processor power consumption that the CPU can run under a sustained processing load, and a power level 2 (OEM PL2) that specifies a higher maximum processor power consumption that a CPU can run for a short period of time to handle higher processing loads and provide increased performance. Processing speeds of dGPUs may also be configurable. For computer gaming applications, there is often a desire to run CPUs and dGPUs at their highest performance level (processing speeds) allowable for a given notebook computer chassis. However, as notebook computers become slimmer, the thermal headroom of the notebook chassis constrains how hard the CPU & GPU can be driven

SUMMARY OF THE INVENTION

Systems and methods are disclosed herein that may be implemented to provide supplemental cooling for a portable information handling system (e.g., such as a notebook or laptop computer) so as to allow for and to achieve increased processing performance from one or more processing devices (e.g., CPUs, dGPUs, etc.) within a chassis enclosure of the portable information handling system. In one embodiment, the disclosed systems and methods may be implemented using an external cooling dock that is configured to provide supplemental cooling for a portable information handling system by blowing sub-ambient temperature air into one or more existing external air intake-vents of the chassis of the portable information handling system so as to cause one or more CPUs and/or dGPUs of the portable information handling system to operate at a given processing level with a lower temperature than would otherwise be possible without the provided supplemental cooling. This supplemental cooling may be further employed to allow the CPUs and/or dGPUs of the portable information handling system to be pushed to higher performance (e.g., processing speed) limits for a given ambient air temperature (e.g., room temperature air) that surrounds the cooling dock and portable information handing system.

In one embodiment, a cooling dock that is external to a portable information handling system may be provided with an internal air chilling system (e.g., thermoelectric cooler, liquid/gas refrigeration system, evaporative cooling, etc.) and one or more cooling fans, together with an internal controller or other processing device that controls the operation of the air chilling system and/or cooling fans. The cooling dock may be configured to electronically dock or otherwise mate in bidirectional signal communication (e.g., bidirectional wired or wireless signal communication) with internal processing devices (e.g., CPU, dGPU, etc.) of a portable information handling system so as to allow the cooling dock processing device to operate cooperatively in a closed loop with the internal processing device/s of the portable information handling system so as to control operation of the cooling dock components and/or the operation of the processing devices within the portable information handling system.

In one embodiment, CPU and/or dGPU overclocking may be automatically switched ON and OFF independent of each other, and depending on real time CPU/GPU temps and/or depending on real time % utilization values read from the CPU and/or dGPU registers by a processing device (e.g., controller) integrated within the cooling dock and/or client software application found installed and running in the notebook PC. Additionally or alternatively, supplemental cooling air may be provided by the cooling dock, and the temperature of the supplemental cooling air and/or the flow rate of the supplemental cooing air may be adjusted in real time based on the real time reading of the CPU and dGPU temps.

For example, an internal controller or other processing device of the cooling dock and/or the cooling dock's client application software may be configured to make adjustments to the amount of cooling (e.g., BTU/hour) provided to the incoming ambient air by the chilling system depending on the sensed temperatures of the CPU and/or dGPU of a portable information handling system, and/or depending on the real-time sensed percentage of utilization of the CPU and/or dGPU of the portable information handling system. In another example, an internal controller or other processing device of the cooling dock (and/or the cooling dock's client application software) may be configured to automatically switch the over-clocking (OC) of the CPU to ON when the CPU utilization is sensed high (e.g., such as equal to 100% utilization or alternatively greater than or equal to some other upper threshold CPU utilization value (such as 90% or 80%) that may be set at the factory or time of manufacture) and to automatically switch the over-clocking (OC) of the CPU to OFF when the CPU utilization is sensed to be low (e.g., such as less than or equal to 30%, less than or equal to 25% or less than or equal to some other lower threshold CPU utilization value set at the factory or time of manufacture). Similarly, an internal controller or other processing device of the cooling dock (and/or the cooling dock's client application software) may be configured to automatically switch the over-clocking (OC) of the dGPU to ON when the dGPU utilization is sensed high (e.g., such as equal to 100% utilization or alternatively greater than or equal to some other upper threshold dGPU utilization value (such as 90% or 80%) that may be set at the factory or time of manufacture) and to automatically switch the over-clocking (OC) of the dGPU to OFF when the dGPU utilization is sensed to be low (e.g., such as less than or equal to 30%, less than or equal to 25% or less than or equal to some other lower threshold dGPU utilization value set at the factory or time of manufacture).

In one exemplary embodiment, the disclosed systems and methods may be implemented in a manner that allows for achievement of the highest CPU and/or dGPU performance possible for a given size of portable information handling system, such as a notebook computer. When so implemented, this may in turn facilitate notebook computers to be designed and fabricated in an ever slimmer form factor. Moreover, a cooling dock may be implemented in a further exemplary embodiment using wireless signal communication between the cooling dock and a portable information handling system, allowing for automatic enabling and disabling of CPU and/or dGPU overclocking independently of each other, and for providing real-time adjusted degree or amount of imparted cooling as required per the real time CPU/dGPU workload in progress.

In one respect, disclosed herein is a cooling dock configured to dock with an information handling system, the cooling dock may include: at least one dock cooling fan configured to supply external supplemental cooling air to an cooling air inlet vent defined in a chassis enclosure of the information handling system; at least one dock chilling system configured to cool the external supplemental cooling air before it is provided to the chassis enclosure inlet vent; and at least one dock control processing device coupled to control at least one of the speed of the dock cooling fan or the temperature of the dock chilling system temperature. The dock control processing device may be configured to be wired or wirelessly coupled to communicate with at least one information handling system processing device located within the chassis enclosure of the information handling system; and the dock control processing device may be further configured to control a temperature and/or flow rate of the supplemental cooling air based on information received from the information handling system processing device that is indicative of processing utilization or overclocking state of one or more processing devices within the chassis enclosure of the information handling system.

In another respect, disclosed herein is a system, including: an information handling system including a chassis enclosure containing at least one information handling system processing device and at least one cooling air inlet vent defined in the chassis enclosure; and a cooling dock positioned in docking relationship with the information handling system. The cooling dock may include: at least one dock cooling fan positioned to supply external supplemental cooling air to the inlet vent defined in a chassis enclosure of the information handling system, at least one dock chilling system configured to cool the external supplemental cooling air before it is provided to the chassis enclosure inlet vent, and at least one dock control processing device coupled to control at least one of the speed of the dock cooling fan or the temperature of the dock chilling system temperature. The dock control processing device is coupled in wired or wireless communication with the information handling system processing device. The information handling system processing device may be configured to provide information indicative of processing utilization or overclocking state of one or more processing devices within the chassis enclosure of the information handling system to the dock control processing device. The dock control processing device may be configured to control a temperature and/or flow rate of the supplemental cooling air based on the information received from the information handling system processing device that is indicative of processing utilization or overclocking state of one or more processing devices within the chassis enclosure of the information handling system.

In another respect, disclosed herein is a method of cooling an information handling system, including: positioning a cooling dock in docking relationship with an information handling system that includes a chassis enclosure containing at least one information handling system processing device and at least one cooling air inlet vent defined in the chassis enclosure; supplying chilled external supplemental cooling air from a cooling fan of the cooling dock to the inlet vent defined in the chassis enclosure of the information handling system; using at least dock control processing device of the cooling dock to control at least one of the speed of the dock cooling fan or the temperature of the supplemental cooling air; providing information from the information handling system processing device that is indicative of processing utilization or overclocking state of one or more processing devices within the chassis enclosure of the information handling system to the dock control processing device; and using the dock control processing device to control a temperature and/or flow rate of the supplemental cooling air based on the information received from the information handling system processing device that is indicative of processing utilization or overclocking state of one or more processing devices within the chassis enclosure of the information handling system.

In another respect, disclosed herein is an information handling system, including: a chassis enclosure containing at least one information handling system processing device and at least one cooling air inlet vent defined in the chassis enclosure, the at least one information handling system processing device including at least one of a host processing device executing an operating system (OS) for the information handling system, a discrete graphics processing unit (dGPU), or a combination thereof. The information handling system processing device located within the chassis enclosure of the information handling system may be configured to be wired or wirelessly coupled to communicate with at least one cooling dock control device of a cooling dock when it is positioned in docking relationship with the information handling system to supply external supplemental cooling air to the cooling air inlet vent defined in the chassis enclosure of the information handling system. The information handling system processing device may be configured to provide information indicative of processing utilization or overclocking state of one or more processing devices within the chassis enclosure of the information handling system to the cooling dock control device.

BRIEF DESCRIPTION OF THE DRAWINGS

FIG. 4 is a lookup table that may be employed to control cooling dock operations and processing device speed or overclocking according to one exemplary embodiment of the disclosed systems and methods

DESCRIPTION OF ILLUSTRATIVE EMBODIMENTS

Figure 1:
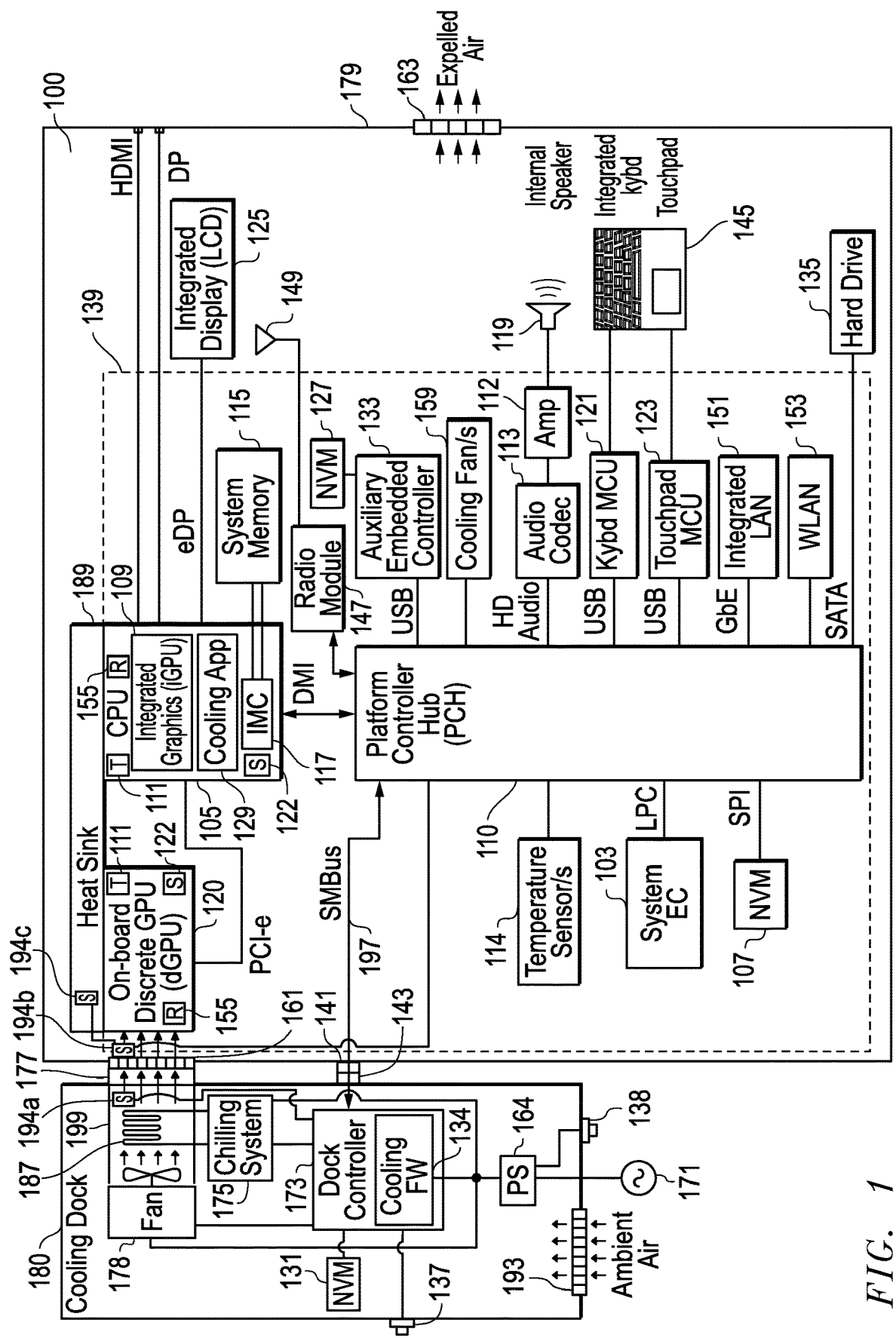
FIG. 1 is a block diagram of an information handling system coupled to a cooling dock according one exemplary embodiment of the disclosed systems and methods.

FIG. 1 is a block diagram of a portable information handling system 100 coupled to a cooling dock 180 according one exemplary embodiment of the disclosed systems and methods. Information handling system 100 may be, for example, a portable information handling system such as a notebook or laptop computer having a chassis enclosure 179 delineated by the outer dashed outline (e.g., outer notebook plastic and/or metal case that surrounds the notebook computer electrical components with vent openings 161 and 163 provided in the case to allow ambient cooling air to be drawn into and circulated through the chassis enclosure 179 by the internal notebook cooling fan/s 159 for dissipating or otherwise transferring heat from a heat sink 189 and its thermally coupled processing device components). As shown in FIG. 1, information handling system 100 of this exemplary embodiment includes various components that may be embedded on a system motherboard 139, it being understood that any one or more of such embedded components may be alternatively provided separate from motherboard 139 within a chassis enclosure 179 or case of information handling system 100, e.g., such as provided on a daughter card or other separate mounting configuration. It will be understood that multiple inlet vents 161 and/or outlet vents 163 may be defined at different locations within chassis enclosure 179, and/or that one or more internal notebook cooling fans 159 may be provided adjacent an inlet vent 161 and/or an outlet vent 163. Moreover, one or more internal cooling fans 159 may be optionally mounted to directly direct cooling air onto heat sink 189.

Still referring to FIG. 1, information handling system 100 may include a host processing device 105 which may be a central processing unit CPU such as an Intel Haswell processor, an Advanced Micro Devices (AMD) Kaveri processor, or one of many other suitable processing devices currently available. Host processing device 105 may execute a host operating system (OS) for system 100, as well as software applications such as computer games. CPU 105 may be configured to operate in different power modes (e.g., by varying CPU clock speed or frequency and voltage), with a relatively higher (e.g., normal maximum allowable clock speed) CPU processing power in a non-throttled mode as long as the operating temperature of CPU 105 is equal to or below a maximum non-throttled operating temperature, and to operate with a relatively lower (e.g., reduced) CPU processing power when the operating temperature of CPU 105 is above a maximum non-throttled operating temperature. CPU 105 may also be configured to optionally operate in multiple different overclock (OC) modes having higher CPU clock speeds than the normal maximum allowable CPU clock speed when the operating temperature of CPU 105 is equal to or below a maximum non-throttled operating temperature. Control of CPU overclocking may be provided, for example, by the system BIOS executing on CPU 105 and stored in NVM 107 or non-volatile memory of System EC 103. Further information on CPU overclock modes and varying clock speeds may be found described, for example, in U.S. patent application Ser. No. 14/664,317 filed Mar. 20, 2015, and in U.S. patent application Ser. No. 14/836,618 filed Aug. 26, 2015, each of which is incorporated herein by reference in its entirety for all purposes.

System memory of information handling system 100 may include main system memory 115 (e.g., volatile random access memory such as DRAM or other suitable form of random access memory) coupled (e.g., via DDR channel) to an integrated memory controller (iMC) 117 of CPU 105 to facilitate memory functions, although it will be understood that a memory controller may be alternatively provided as a separate chip or other circuit in other embodiments. Optional nonvolatile memory (NVM) 127 such as Flash, EEPROM or other suitable non-volatile memory that may also be coupled to CPU 105. CPU 105 itself may also include an integrated GPU (iGPU) 109 as shown.

As shown in FIG. 1, information handling system 100 also includes a separate internal discrete GPU (dGPU) 120 that may be powered by a power source of information handling system (e.g., such as AC adapter and/or internal smart battery pack of a notebook computer) using internal integrated power supply circuitry and/or internal voltage regulation circuitry of information handling system 100. dGPU 120 may be, for example, a PCI-Express (PCI-e) graphics card that is coupled to an internal PCI-e bus of information handling system 100 by multi-lane PCI-e slot and mating connector. In a manner similar to host processing device 105, dGPU 120 may also be configured to operate in different power modes (e.g., by varying dGPU clock speed), with a relatively higher (e.g., full) dGPU processing power in a non-throttled mode as long as the operating temperature of dGPU 120 is equal to or below a maximum non-throttled operating temperature, and to operate with a relatively lower (e.g., reduced) dGPU processing power when the operating temperature of dGPU 120 is above a maximum non-throttled operating temperature. As described for the host processing device 105, dGPU may also be configured to operate at an increased overclocked processing speed when sensed dGPU temperature is equal to or below the maximum non-throttled operating temperature, e.g., in response to overclock control commands provided by the graphics processor's API.

In one optional mode of operation, video content from CPU 105 may be sourced at any given time either by iGPU 109 or dGPU 120, and may be switchable "on the fly" from one to the other using drivers of a switchable graphics software utility (e.g., such as NVidia Optimus available from NVidia of Santa Clara, Calif.; AMD Power Express available from Advanced Micro Devices Inc. of Sunnyvale, Calif.). As further shown, CPU 105 and dGPU 120 are each thermally coupled to a common shared heat sink 189 so as to allow heat transfer (e.g., and in this case mechanically coupled to allow conductive heat transfer) to common shared heat sink 189 which is configured to absorb, dissipate and/or otherwise transfer heat produced by operation of CPU 105 and dGPU 120 to the surrounding cooling air circulated through chassis enclosure, e.g., between vents 161 and 163. Further information on configurations of shared heat sinks and cooling resources may be found described in U.S. patent application Ser. No. 14/836,618 filed on Aug. 26, 2015, which is incorporated herein by reference in its entirety for all purposes.

In the illustrated embodiment, one or more cooling fan/s 159 may be present to draw cooling air through optional inlet vent opening/s 161 into enclosure 179 and to circulate this cooling air across and in contact with fins of heat sink 189 and then out of enclosure 179 through optional outlet vent opening/s 163. It will be understood that in other embodiments, each of processing devices (CPU 105 and dGPU 120) may be provided with its own attached dedicated heat sink and/or cooling fan 159.

In one embodiment, external connectors (e.g., digital HDMI or DVI, analog D-Sub/S VGA, etc.) may be provided for coupling at least one external display (e.g., LCD display or other suitable display device) by external video cabling to receive and display visual images received from dGPU 120 of information handling system 100. As shown, dGPU 120 may be coupled to single graphics input/output (I/O) from iGPU 109 of CPU 105 by an internal PCI-e bus. It will be understood that in one embodiment, system 100 may be optionally configured for coupling to an external graphics dock system and/or one or more additional external displays as described in U.S. patent application Ser. No. 14/523,547 filed Oct. 24, 2014 and entitled "Systems And Methods For Orchestrating External Graphics" by Sierra et. al, which is incorporated herein by reference in its entirety for all purposes.

As further illustrated in FIG. 1, CPU 105 may be coupled to embedded platform controller hub (PCH) 110 which may be present to facilitate input/output functions for the CPU 105 with various internal components of information handling system 100. In this exemplary embodiment, PCH 110 is shown coupled to other embedded components on a motherboard 139 that include system embedded controller 103 (e.g., used for implementing power control logic to detect real time events such as real time operating dGPU temperature provided by respective integrated temperature sensors 122 of dGPU 120 and CPU 105 across PCH 110, controlling dGPU and CPU power consumption by setting CPU power limits across PCH 110, otherwise exchanging control and sensed temperature information across PCH 110 with each of dGPU 120 and CPU 105, etc.). Also as shown in FIG. 1, one or more optional motherboard temperature sensors 114 may also be provided as shown for monitoring internal chassis temperatures at one or more different motherboard locations (e.g., such as adjacent to dGPU 120 and/or CPU 105), it being understood that other chassis temperature sensor/s may be similarly provided off-motherboard within the chassis 179, e.g., such as to sense ambient temperature at an air inlet 161 of the chassis 179. In one embodiment, non-volatile persistent storage 107 or other non-volatile memory may be provided on motherboard 139 to store thermal control parameters that may be accessed by system EC 103 which may in turn control operation of cooling fan/s 159 based on the thermal control parameters and measured temperature information received from sensors 122 and/or 114.

Also shown in FIG. 1, a register 155 of each of CPU 105 and dGPU 120 may store a component temperature threshold value set by the component manufacturer and above which the component provides a critical temperature warning and component thermal throttling control 111 is activated to reduce the component (e.g., CPU or dGPU die) temperature, e.g., using clock modulation and/or by throttling down the processing device clock speed and operating input voltage until the sensed component temperature drops again below the maximum component temperature. A separate component fan control target setpoint temperature value in the form of a component fan control target temperature setpoint temperature value (e.g., such as CPU or dGPU fan control target setpoint temperature value) may be a static value maintained in register 155 of each of CPU 105 or dGPU 120 and may be set by the component manufacturer below the component thermal throttling temperature threshold as a target component operating temperature. Further information on systems and methods for processing device thermal control may be found in U.S. patent application Ser. No. 14/664,317 filed Mar. 20, 2015, which is incorporated herein by reference in its entirety for all purposes.

Still referring to FIG. 1, host CPU 105 of this embodiment may execute a client software application in the form of cooling dock control application 129 (e.g., Windows application) that interfaces through an application programming interface (API) with system BIOS of CPU 105 to read real time CPU operating temperature and/or real time CPU utilization value (e.g., percentage or fraction of full CPU utilization). Host CPU 105 may also execute cooling dock control application 129 to interface through another application programming interface (API) with dGPU 120 to read real time dGPU operating temperature and/or real time dGPU utilization value (e.g., percentage or fraction of full CPU utilization). Cooling dock control application 129 may be configured to further control overclocking (e.g., enable, disable and/or vary overclocking speed) and/or operating voltage of CPU and/or dGPU based on the selected mode of operation and/or real time CPU operating temperature, e.g., through appropriate API's.

Such control may be supplemented with leveraging the existing fan curve and chip temperature lookup table found in NVM 107 and the sensed supplemental cooling air temperature (e.g., as sensed by dock temperature sensor 194a and/or by an optional temperature sensor 194b mounted within chassis 179 to sense ambient temperature at an air inlet 161 and report this sensed temperature directly to CPU 105) entering into the air intake vents 161. As further shown, an optional heat sink temperature sensor 194c may be present in one exemplary embodiment (with or without sensor 194b) to sense a real time operating temperature of shared heat sink 189, and to report this sensed shared heat sink temperature to CPU 105 as shown. It will be understood that in one such embodiment cooling dock control application 129 may use this sensed shared heat sink temperature in place of sensed real time CPU operating temperature and/or real time CPU utilization value in the methodologies and techniques described elsewhere herein to control CPU and/or dGPU processing speed and/or overclocking, and/or to control cooling dock fan 178 rotational speed and/or chilling temperature of chilling system 175.

In one embodiment, cooling dock control application 129 may take all these factors into account to decide when to enable or disable CPU and/or dGPU overclocking, and to what degree to overclock. The output from the cooling dock control application 129, such as the overclock control info, may be sent to system BIOS via an API, where the overclocking changes to the system are made or otherwise controlled by system BIOS. In one embodiment, cooling dock control application 129 may wirelessly or wired output to dock controller 173 both the temperature (e.g., setpoint) to which chilling system 175/187 needs to cool the supplemental cooling air provided from dock 180 to inlet vent opening 161 of the chassis enclosure, and the target rotational speed (e.g., RPM) or setpoint for cooling dock fan/s 178. Cooling dock control application 129 may also output any appropriate OC control information (e.g., including whether to enable or disable overclocking) via an API to the system BIOS executing on CPU 105.

Referring to FIG. 4, the cooling dock control application 129 may perform additional calculations based on read inputs such as supplemental cooling air temperature, CPU temp and dGPU temp (not shown in FIG. 4) as well as CPU % utilization and dGPU % utilization, which may be used as additional inputs to provide outputs across a broader set of product use cases (noted in Description column) to control overclocking changes, temperature changes to the chilling system 175/187 and rotational speed for cooling dock fans/s 178.

In one alternate embodiment, cooling dock control application 129 may be executed on dock controller 173 rather than CPU 105. In such a case, the cooling dock control application 129 may be embedded as firmware in internal non-volatile (e.g., Flash) memory 134 of dock controller 173, and may communicate to system 100 (e.g., notebook computer) via wired (e.g., USB such as in FIG. 1) or wireless (e.g., Bluetooth such as in FIG. 2) communication interfaces. In such an embodiment cooling dock control application may also perform temperature readings through the software (SW)/BIOS API previously described with system BIOS of CPU 105 to read real time CPU operating temperature and/or real time CPU utilization value (e.g., percentage or fraction of full CPU utilization), and similarly through the dGPU API with dGPU 120 to read real time dGPU operating temperature and/or real time dGPU utilization value (e.g., percentage or fraction of full CPU utilization). In such an embodiment, dock controller 173 may continue to output temperature and fan speed control instructions to the chilling system 175 (e.g., one or more Peltier chips, etc.) and dock fan/s 178 (rpm), as well as to output control signals for any changes to CPU and/or dGPU overclock status via the API to the system BIOS for the CPU 105 and/or through the dGPU API for the dGPU 120.

As further shown in FIG. 1, motherboard 139 may also include wireless network card (WLAN) 153 for Wi-Fi or other wireless network communication, integrated network interface card (LAN) 151 for Ethernet or other wired network connection, touchpad microcontroller (MCU) 123, keyboard microcontroller (MCU) 121, audio codec 113, audio amplifier 112, and auxiliary embedded controller 133 which may be implemented by a microcontroller. The tasks and features of an optional auxiliary embedded controller 133 may include, but are not limited to, controlling lighting effects (e.g., keyboard lighting effects) for the chassis of information handling system 100 and/or optional external dock system lighting effects, e.g., in response to user configuration and/or in response to commands from particular applications executing on CPU 105 such as described in U.S. patent application Ser. No. 14/523,547 filed Oct. 24, 2014 and entitled "Systems And Methods For Orchestrating External Graphics" by Sierra et. al, which is incorporated herein by reference in its entirety for all purposes. Other optional components that may be present include radio module 147 (e.g., Bluetooth low energy (BLE), Bluetooth Classic, 802.11, etc.) that itself may include a baseband processing device coupled to at least one antenna element 149, and which in one embodiment may be provided as an expansion card on a printed circuit board (PCB) and/or may be configured as described in U.S. patent application Ser. No. 14/734,453 filed Jun. 9, 2015 and entitled "Systems and Methods for Controlling Radio Transmit Power for Information Handling Systems Based on System-Specific RF Parameters" by Prendergast et. al, which is incorporated herein by reference in its entirety for all purposes.

Also shown coupled to PCH 110 are other non-embedded internal components of information handling system 100 which include integrated display 125 (e.g., LCD display or other suitable integrated portable information handling system display device), internal speaker 119, integrated keyboard and touchpad 145, and local system storage 135 or other suitable type of permanent storage media such as solid state drive (SSD), optical drives, NVRAM, Flash or any other suitable form of internal storage. It will also be understood that persistent storage (e.g., non-volatile memory) may be additionally coupled to PCH 110, system EC 103 and/or auxiliary EC 133 (e.g., NVM 127 as shown). Such persistent storage may store or contain firmware or other programming that may be used by EC 103 and/or EC 133 to implement one or more user-defined system configurations.

In one embodiment, information handling system 100 may be a battery-powered information handling system that is coupled to a source of system (DC) power, for example AC mains and an AC adapter. Information handling system may also include an internal DC power source (e.g., smart battery pack) that is configured to provide system power source for the system load of information handling system, e.g., when an external source of system power is not available or not desirable. Further information on battery-powered information handling system architecture and components may be found in United States Patent Application Publication Number 20140281618A1, which is incorporated herein by reference in its entirety for all purposes. It will also be understood that the particular configuration of FIG. 1 is exemplary only, and that an information handling system may be configured with fewer, additional or alternative components than those illustrated in FIG. 1, e.g., including a network interface card (wired and/or wireless).

Still referring to FIG. 1, external cooling dock 180 is shown coupled to use at least one internal dock cooling fan 178 to provide supplemental cooling air into air inlet 161 of chassis 179 from a cooling air supply output 177 that in this embodiment is at least partially aligned with chassis air inlet 161 as shown. As further shown in FIG. 1, external cooling dock 180 includes at least one on-board dock control processing device that in this embodiment is configured as a dock controller 173 which is temporarily coupled to CPU 105 and dGPU 120 via PCH 110 by a wired data communication path 197 (e.g., Universal Serial Bus (USB), SMBus, Inter-Integrated Circuit (I²C) or other suitable data bus) via docking connectors 143 and 141 for purpose of communicating data and/or commands between dock controller 173 and each of CPU 105 and dGPU 120 to implement the systems and methods described herein. Dock controller 173 may be a microcontroller (MCU) or any other type of processing device suitable for performing the controller tasks described herein. It will be understood that dock controller 173 may be alternatively coupled to wirelessly exchange data and/or commands with CPU 105 and dGPU 120 using any suitable wireless communication medium, e.g., such as radio frequency (RF) communications (Bluetooth, Wi-Fi (802.11-based), etc.), optical (e.g., laser) communications, near field electro-magnetic communications, etc. Dock controller 173 is also coupled to non-volatile memory 131 and is configured to execute cooling dock firmware 134 stored thereon. As further shown in FIG. 1, cooling dock 180 may also include power supply and voltage regulation circuitry 164 coupled to receive AC mains current 171 to power processing device 173, fan 178 and chilling system 175, and other power-consuming components of dock 180 that may be optionally present. Alternatively an external AC/DC adapter may be coupled between AC mains 171 and information handling system 100.

Dock controller 173 is further coupled as shown to use cooling dock firmware 134 to control operation of dock cooling fan/s 178 and chilling system 175 which in this embodiment includes a heat exchanger or heat sink 187 to cool supplemental cooling air provided from dock cooling air supply output 177 to air inlet 161 of chassis 179. In this regard, firmware stored on NVM 131 may include chilling system control parameters (e.g., Peltier voltage and current, etc.) and dock cooling fan settings corresponding to real time measured CPU and dGPU temperatures, e.g., in a look-up-table found in the dock's firmware. Table 1 illustrates an example embodiment of simplistic control of chilling system parameters corresponding to simply the values of real time CPU operating temperature and/or real time dGPU operating temperature as may be reported by CPU 105 and dGPU 120 respectively to cooling dock 180. Also shown are corresponding values for duty cycle of notebook computer cooling fans 159.

| Notebook Computer Cooling Fan Curves (located in Notebook Computer BIOS) | | Corresponding Chilling System Parameters (Peltier and Cooling Dock Fan settings in Cooling Dock Firmware) | |
|---|---|---|---|
| CPU Temp (° C.) | CPU Fan Duty Cycle (%) | Dock Fan Duty Cycle (%) | Dock Peltier (Volts in) |
| 35 | 0 | 0 | 0 |
| 45 | 20 | 30 | 8 |
| 55 | 40 | 30 | 8 |
| 65 | 60 | 50 | 10 |
| 75 | 80 | 75 | 10 |
| 85 | 100 | 100 | 12 |
| 95 | 100 | 100 | 12 |
| dGPU Temp (° C.) | dGPU Fan Duty Cycle (%) | Dock Fan Duty Cycle (%) | Dock Peltier (Volts in) |
| 30 | 0 | 0 | 0 |
| 40 | 20 | 30 | 8 |
| 50 | 40 | 30 | 8 |
| 60 | 60 | 50 | 10 |
| 70 | 80 | 75 | 10 |
| 80 | 100 | 100 | 12 |
| 90 | 100 | 100 | 12 |

In the illustrated embodiment of FIG. 1, chilling system 175 may be any type of cooling device (e.g., thermoelectric cooler (TEC) or Peltier cooling device thermoelectric module (TEM), vapor compression refrigeration device, absorption refrigeration device, etc.) that is suitable for removing heat via heat exchanger/sink 187 from the incoming ambient temperature (e.g., room temperature) air of dock air intake 193 to produce sub-ambient temperature supplemental cooling air that is provided from dock cooling air supply output 177 to inlet vent/s 161 of chassis enclosure 179. In one embodiment, chilling system 175 may itself include a hot-side heat exchanger and associated fan for dissipating collected heat from the chilling system, e.g., as further described and shown in FIG. 2A herein. The temperature of the sub-ambient air is cooler than the available external ambient temperature air that surrounds the cooling dock 180 and the chassis enclosure 179, and in one embodiment is at least 10° F. cooler than the available ambient temperature air incoming through dock air intake vent 193, and alternatively from about 10° F. to about 30° F. cooler than the available ambient temperature air incoming through dock air intake vent 193.

In one exemplary embodiment, dock controller 173 may be a system on chip (SoC) such as part number nRF51822 available from Nordic Semiconductor of Trondheim, Norway. Such a chip contains an ARM processor and Bluetooth low energy transceiver. In another exemplary embodiment, chilling system 175 may be be a solid state Peltier module such as part number CP60440 available from CUI Inc. of Tualatin, Oreg. However, these are only exemplary, and any other suitable controller and/or chilling devices may be alternatively employed.

In one embodiment of FIG. 1, on-board dock controller 173 may be configured to read real time chip operating temperature of at least one of CPU 105 and dGPU 120 reported from integrated temperature sensor/s 122, read real time internal chassis temperature from temperature sensors 114, and/or to read real time processor utilization values (e.g., percentage or fraction of full utilization) reported by at least one of CPU 105 and dGPU 120, e.g., reported to controller 173 across wired communication path 197 or alternatively using a wireless communication path. Dock controller 173 may be configured to respond to either one of these reported chip operating temperatures and/or processor utilization values by making adjustments to chilling system 175 in order to increase or decrease the temperature of supplemental cooling air provided from dock cooling air supply output 177 to air inlet 161 of chassis enclosure 179 based on the current real time chip operating temperature/s and/or chip utilization value/s.

For example, in the case of a chilling system 175 that includes a Peltier chip TEM, dock controller 173 may make adjustments to the voltage and current applied to the TEM (i.e., making the temperature of heat exchanger/sink 199 colder or warmer), and may also make adjustments to pulse-width modulation (PWM) signals to control the speed of the cooling fan/s 178 that circulate incoming ambient air across the heat exchanger (e.g., heat sinks) 187 of the TEM and to the dock cooling air supply output 177. Further information on one embodiment of such temperature and fan speed control may be found described in relation to FIG. 3 herein. Alternatively, cooling dock firmware 134 on dock controller 173 may be configured to control operation of chilling system 175 and dock fans 178 and 278 based on pre-determined settings (e.g., predetermined levels of Peltier chip voltage and current for chilling system 175, and pre-determined speed levels of dock fans 178 and 278) according to manual input received from a user by pressing manual mode button 137 (e.g., electromechanical switch, capacitive or resistive sensing switch, etc.), in a manner described further herein. In one embodiment, cooling dock firmware 134 of dock controller 173 may further optionally write chilled air temperature back to the cooling dock control application (which may be located in either the PC or in the chilling dock), where the cooling dock control application may then determine whether to enable or disable overclocking of the CPU 105 and/or dGPU 120, and determine whether or not the chilling system 175 is functioning as expected (or may have failed as shown in one method of embodiment in FIG. 4).

Figure 2A:
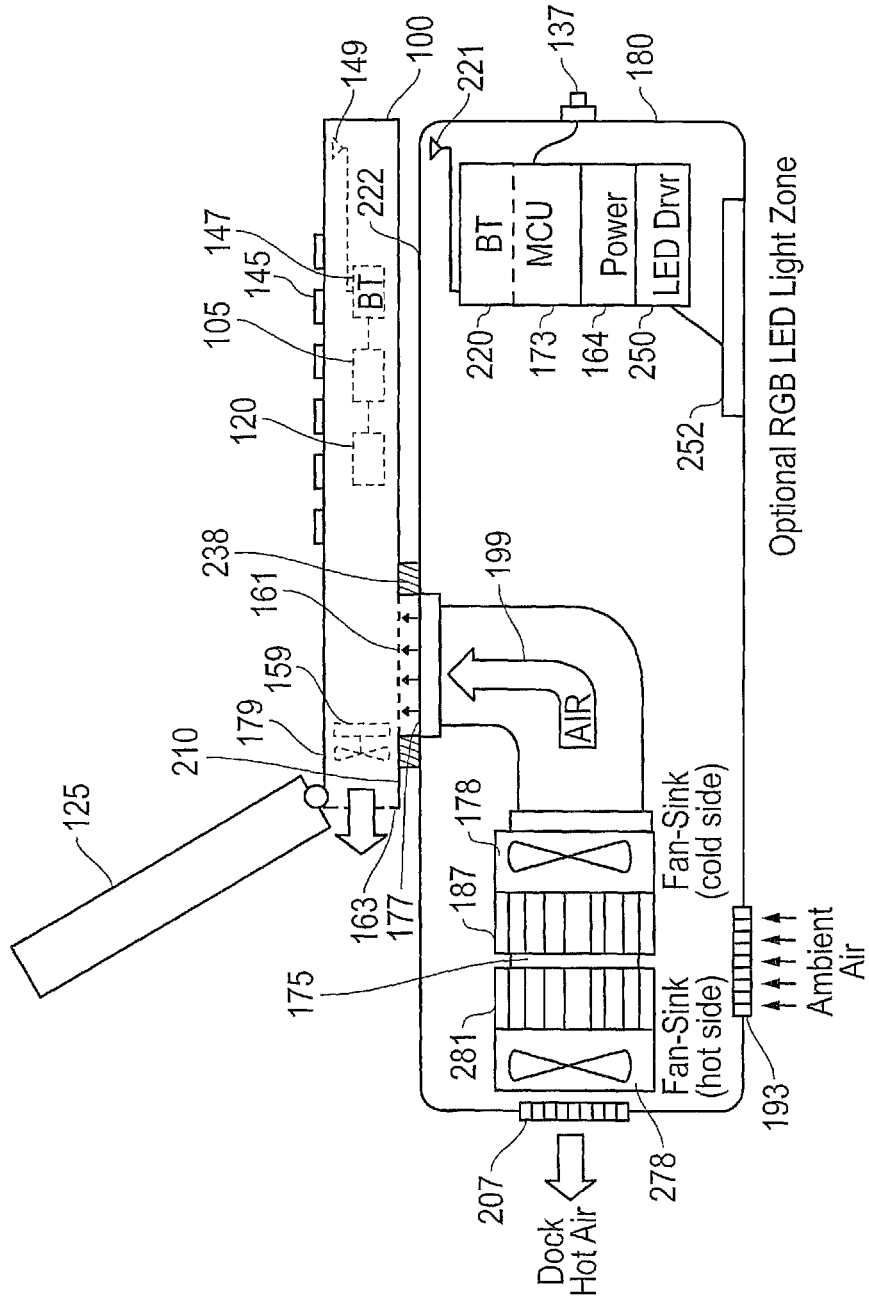
FIG. 2A illustrates an information handling system coupled to a cooling dock according one exemplary embodiment of the disclosed systems and methods.

FIG. 2A illustrates one exemplary embodiment of a cooling dock 180 that is positioned to provide supplemental cooling air to an air intake 161 of an information handling system 100 that is configured as a notebook computer. In this embodiment cooling dock 180 is physically configured as a base or stand upon which notebook computer 100 rests during operation with notebook computer air intake 161 positioned adjacent and above cooling air supply output 177 of cooling dock 180 to receive supplemental cooling air from cooling air supply output 177 as shown. In the illustrated embodiment, chilling system 175 is provided as a TEM that is coupled between a hot-side heat sink 281 and a cold side heat sink 187 to allow ambient temperature air to be drawn in at dock air intake 193 and cooled by cold side cooling fan 178, with hot side cooling fan 278 circulating ambient temperature air drawn in at dock air intake 193 across hot side heat sink 281 and out hot air outlet 207 to exhaust heat generated by chilling system 175 (e.g., such as TEM in chilling system 175). As shown, cold side cooling fan 178 may be configured to circulate the supplemental cooling air through a cooling air supply duct 199 (e.g., such as polyvinyl chloride pipe, aluminum pipe, fiberglass pipe, or any other suitable air duct structure with thermal insulation surrounding it) and out cooling air supply output 177 which is aligned with notebook computer air intake 161.

In the illustrated embodiment of FIG. 2A, the cold side air path and hot side air path are thermally segregated from each other with the two air paths only sharing a common ambient air intake 193, although it is alternatively possible that a separate hot side ambient intake and separate cold side ambient air intake may be provided. It will further be understood that an optional elasticized grommet or conduit 238 (e.g., rubber, plastic or other suitable material) may be provided on the top surface 222 of dock 189 around dock cooling air supply output 177 so as to form a substantially air tight seal between the hot underside surface 210 of notebook computer 100 and the top surface 222 of dock 189 around a supplemental cooling air path between dock cooling air supply output 177 and notebook computer air intake 161.

Still referring to the embodiment of FIG. 2A, electronic components of cooling dock 180 include cooling dock controller 173 that is coupled to, or co-integrated with, a Bluetooth radio module 220 coupled to antenna 221 and that is configured to exchange data and control signals between cooling dock controller 173 and CPU 105 and dGPU 120 via radio module 147 and antenna 149 of notebook computer system 100 using Bluetooth wireless signals. Components of Bluetooth radio module 220 may be included within dock controller 173 (e.g., such as Nordic Semiconductor part number nRF51822) and/or may be configured in similar manner as Bluetooth radio module 147 of FIG. 1. Other illustrated optional components of FIG. 2A include optional light emitting diode (LED) driver 250 that is coupled to control red-green-blue (RGB) LED lights or other elements of a light zone 252 mounted in dock 180 and configured to emit light externally from dock 180, e.g., in a manner such as described in U.S. patent application Ser. No. 14/523,547 filed Oct. 24, 2014 and entitled "Systems And Methods For Orchestrating External Graphics" by Sierra et. al, which is incorporated herein by reference in its entirety for all purposes.

Figure 2B:
FIG. 2B illustrates an information handling system in wireless or wired communication with a cooling dock according one exemplary embodiment of the disclosed systems and methods.

FIG. 2B illustrates an information handling system 100 (e.g., portable information handling system such as notebook computer) in bi-directional wireless or wired communication with a cooling dock 180 according to one exemplary embodiment of the disclosed systems and methods. In this exemplary embodiment (and as will be described further herein) bi-directional communication and cooperative closed loop activity between host processing device 105 of information handling system 100 and dock controller 173 of cooling dock 180 initiates upon pairing (wireless or wired) communication between host processing device 105 of information handling system 100 and the dock controller 173 of dock 180. In one embodiment, host processing device 105 of information handling system 100 does not look for presence of a cooling dock 180, but rather for successful pairing which thus provides bidirectional communication path between the host processing device 105 of information handling system 100 and the dock controller 173 of cooling dock 180.

Before initiating methodologies such as illustrated in FIGS. 2C and 3A-3C, host processing device 105 of information handling system 100 may check to see which processors in a chassis enclosure of the information handling system 100 (e.g., including dGPU 120, CPU 105, etc.) are capable of being overclocked. Host processing device 105 of information handling system 100 may also check the % utilization activity and chip temperatures of all processing devices in the chassis enclosure of the information handling system 100. Host processing device 105 may then send this information to dock controller 173 (e.g., to be entered into an internal lookup table in the dock controller 173) which outputs the voltage and current setting that should be applied to the chilling system 175, and the speed of the dock fan/s 178 to blow out the chilled supplemental cooling air. These voltage and current settings may in turn be sent to a suitable electronics circuit inside the cooling dock 180 that generates the voltage and current required by the chilling system 175, and the fan speed is sent to a PWM which generates the applicable waveform which will be sent to the dock's fan/s 178 to control fan RPM speed.

In one embodiment, cooling dock 180 may have an embedded temperature sensor 194*a* as previously described that is coupled to dock controller 173 and that is positioned to sense the chilled supplemental cooling air temperature exiting the dock and entering into the notebook's air in-take vent/s 161. This real time sensed supplemental cooling air temperature may be sent from the dock controller 173 to the host processing device 105 of the information handling system 100. Host processing device 105 of information handling system 100 may accept this real time sensed supplemental cooling air temperature reading as an input, along with one or more other inputs (e.g., such as real time % processing utilization activity and/or operating temperatures for one or more or all of processing devices within chassis enclosure 179) and a decision is made whether to overclock any of the applicable processing devices and to what degree (e.g., such as increasing a processor's voltage and/or clock frequency).

In one embodiment, overclock (OC) levels may be pre-set ahead of time (e.g., Overclock Level 1, Overclock Level 2, etc.). As a result, this closed loop system allows the cooling dock 180 in one embodiment to support dynamic multi-processor performance enhancements on-the-fly according to whether the information handling system processing devices are operating in a safe temperature, whether any of the processing devices are running a high-processor utilization application, and/or whether the clock speed of one or more applicable processing device/s may be bumped up (or down) in overclock performance safely, on-the-fly, knowing the processing devices are operating in a safe temperature under a high utilization scenario, and with knowledge of whether the chip temperature is on its way to decrease or increase according to and based on knowledge of temperature of the supplemental cooling air that is starting to enter the chassis enclosure 179.

FIGS. 2C and 3A-3C illustrate exemplary embodiments of methodology that may be employed to provide supplemental cooling for a notebook computer 100 such as illustrated in FIG. 2A, as well as to achieve increased processing performance from a CPU and dGPU of notebook computer 100. Although described in relation to the embodiment of FIG. 2A, it will be understood that the disclosed systems and methods may be employed with a cooling dock in combination with any other type or configuration of portable information handling system having an inlet vent for admitting cooling air to cool processing devices within a chassis enclosure of the information handling system.

Figure 2C:
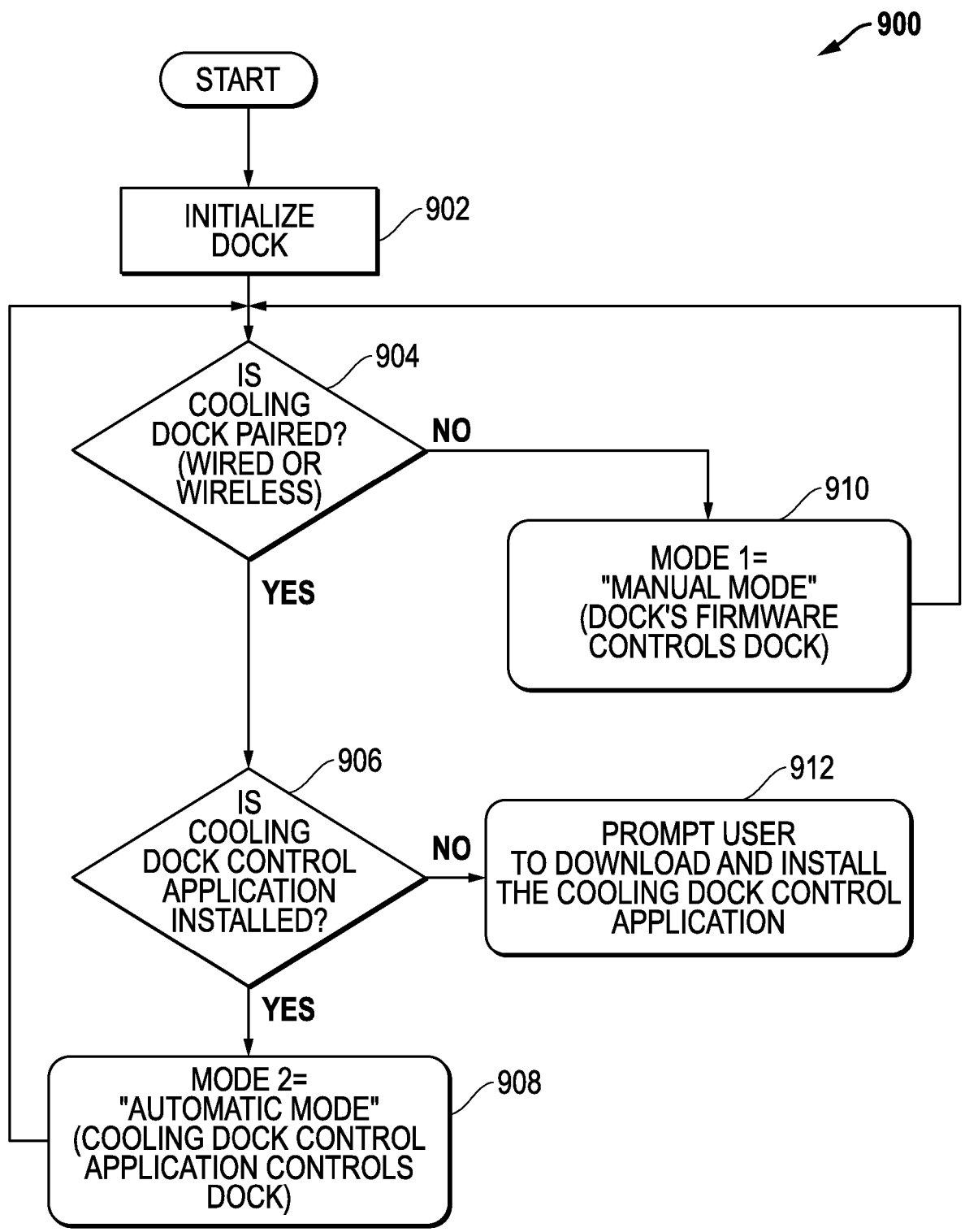
FIG. 2C illustrates methodology according one exemplary embodiment of the disclosed systems and methods.

In particular, FIG. 2C illustrates one exemplary embodiment of methodology 900 that may be implemented according to one exemplary embodiment of the disclosed systems and methods. In such an embodiment, upon recognition by the cooling dock control application 129 of the presence and identity of the cooling dock firmware 134 and controller 173, a software and/or firmware orchestration between the notebook computer 100 and the cooling dock 180 may be enabled as described in step 908 below to allow cooling dock controller 173 integrated in the cooling dock 180 to control operation of the cooling dock components, e.g., by adjusting chilling system 175 (e.g., Peltier power or voltage and current) and by adjusting rotational speed (RPM) of dock cooling fans 178 and 278 based on real time CPU and/or dGPU operating temperatures and % utilization, as well as controlling operation of optional lighting 250/252 when present. As shown, methodology 900 starts in step 902, e.g., with the cooling dock 180 physically positioned adjacent a notebook computer 100 in the manner illustrated in FIG. 2A. Cooling dock 180 is powered up and initialized in step 902, e.g., such by user connecting the dock 180 to AC mains 171 or by user turning on dock 180 by pressing a cooling dock main power button 138. In one embodiment, wireless or wired pairing may also occur during step 902 where such pairing is possible or allowed.

Methodology 900 then proceeds to step 904 where it is determined by firmware 134 executing on the cooling dock controller 173 whether the cooling dock 180 is in communication (e.g., wired or wireless communication) with host CPU 105 of an associated notebook computer 100. If so, then methodology 900 proceeds to step 906, where dock controller 173 communicates with host CPU 105 of notebook 100 to determine if cooling dock control application 129 is installed and executing on CPU 105. If cooling dock control application 129 is not installed and executing, then methodology 300 may proceed to step 912 where an optional message may be displayed on display device 125 that prompts the user to download the cooling dock control application 129 (e.g., from Internet, corporate intranet, etc.) or otherwise load cooling dock control application 129 onto notebook computer 100, e.g., such as from a USB thumb drive, optical disk, or other suitable source.

It will be understood that in one alternative embodiment, and additional step may be performed between steps 904 and 906, where a user is allowed to select manual operation mode 1 to cause methodology 900 to proceed to step 910 rather than to step 906 even if the answer to step 904 is "Yes"). Such a user selection may be entered, for example, by pressing a manual mode button 137, or by pressing a separate button provided on cooling dock 180, or by entering keystroke on keyboard 145 through cooling dock control application 129 to firmware 134 executing on the cooling dock controller 173, etc. However, in this alternate embodiment, if the user has not so selected manual operation mode 1, then methodology 900 proceeds as previously described from step 904 to 906.

However, if cooling dock control application 129 is executing on CPU 105, then methodology enters Mode 2 (automatic control) operation of step 908. As will be further described herein when in automatic control Mode 2, the cooling dock control application 129 controls operation of the docking station, and cooling dock firmware 134 executing on cooling dock controller 173 begins to read the CPU and dGPU temperatures, CPU and dGPU % utilization values, and/or begins making adjustments to the cooling dock's cooling mechanisms (e.g., Peltier chip power input of chilling system 175 and/or RPMs of the cooling dock fans 178) so that the CPU 105 and dGPU 120 may perform at increased or maximum processing performance level while at the same time operating in a safe temperature range, e.g., which may be pre-defined by the corresponding chip manufacturer. Additionally, when dGPU 120 is detected to be operating at a high level of utilization, the dGPU 120 may be automatically overclocked (OC) until such time that this utilization level has been detected to have dropped, and the same may hold true for the CPU 105 when a high level of CPU utilization has been detected (and drops). In one exemplary embodiment, CPU and/or dGPU over-clocking is not performed by the cooling dock 180 or its controller 173, but by the cooling dock control software application 129 executing on CPU 105.

More specifically cooling dock control application 129 executing on CPU 105 may read real time CPU operating temperature and real time CPU utilization via API to the system BIOS executing on CPU 105, and may read real time dGPU operating temperature and real time dGPU utilization via a GPU API (e.g., graphics vendor API). Cooling dock control application 129 executing on CPU 105 then may instruct the dock controller 173 of cooling dock 180 (e.g., via wireless or wired connection) how the temperature of chilling system 175 should be controlled (e.g., what temperature to cool to), and to what speed that cooling dock fans 178 and 278 should be configured to rotate. Cooling dock control application 129 may also optionally monitor in real time the temperature of the supplemental cooling air provided by cooling dock 180, via use of thermal diode/sensor 194a, and use this as additional input to its cooling control look-up table and/or algorithm which outputs to both the dock controller 173 as well as the BIOS components of CPU 105 and/or dGPU 120 (e.g., via their respective API's). The cooling dock controller 173 may also read real time temperature of supplemental cooling air provided from cooling dock 180 as it is sensed by integrated cooling dock temperature sensor 194, and report this sensed temperature to cooling dock control application 129 which in turn may display the real time sensed temperature of supplemental cooling air on a cooling dock control graphical user interface (GUI) or other visual presentation made on display 125 of notebook computer 100.

In one exemplary embodiment, when in automatic mode 2 cooling dock control application 129 may also optionally display other cooling dock and notebook computer status information to a user on a cooling dock control GUI of display 125, e.g., such as wireless pairing status (paired or not paired), real time speed of cooling dock fans 178 and/or 278, proper versus improper operation status lights for each of chilling 175 system and dock cooling fans 178 and 278, real time CPU temperature, real time dGPU temperature, detected overclock capability (yes or no) of each of CPU 105 and dGPU 120, real time auto-overclocking status (e.g., overclocking % or non-overclocked status) of CPU 105 and dGPU 120, etc. As will be further described, in Mode 2 cooling dock control application 129 may instruct the system BIOS (for CPU 105) or graphics BIOS (for dGPU 105) to make overclock adjustments (e.g., disabling or enabling overclocking (e.g., overclock Level 1 or overclock Level 2), as appropriate, via appropriate API). In this regard, control via appropriate CPU and/or dGPU API may be implemented to support different levels of CPU and/or dGPU overclocking, e.g., such as by disabling overclocking, enabling OC Level 1 (relatively lower performance), enabling overclock level 2 (relatively higher performance than OC Level 1), etc. In this regard, each OC level may have an associated voltage level and clock frequency (e.g., which may be predetermined, tested and approved by system and/or processor manufacturer). As shown in FIG. 2C, methodology 900 may iteratively repeat from step 908 to 904 such that cooling dock 180 may transition to manual control mode 1 of step 910 in the event that wireless pairing is lost.

Still referring to FIG. 2C, if in step 904 it is determined that the cooling dock 180 is not in wired or wireless communication with a host CPU 105 of an associated notebook computer 100, then methodology 900 proceeds to step 910 where cooling dock controller 173 enters Mode 1 (manual control mode) where cooling dock firmware 134 controls temperature of chilling system 175, as well as rotational speed of cooling dock fans 178 and 278 per user control instruction and stored settings retrieved from dock NVM 131. Such user input may be entered by pressing manual mode button 137 on cooling dock 180 or by using any other suitable input device or method to dock controller 173. In one embodiment, manual mode may be implemented by a user where cooling dock control application 129 is either not present or operable on notebook computer 100, or where notebook computer 100 is otherwise not capable of operably communicating with dock controller 173 of cooling dock 180.

In manual Mode 1, host CPU 105 of notebook computer 100 is not aware of cooling dock 180, but rather cooling dock 180 operates independently and without data or signal communication between notebook computer 100 and cooling dock 180, e.g., even if dock 180 is not physically positioned adjacent a notebook computer 100. As shown in FIG. 2C, methodology 900 may iteratively repeat from step 910 to 904 such that cooling dock 180 may transition to automatic control Mode 2 of step 908 in the event that wireless pairing becomes available while cooling dock 180 is operating.

Figure 3A:
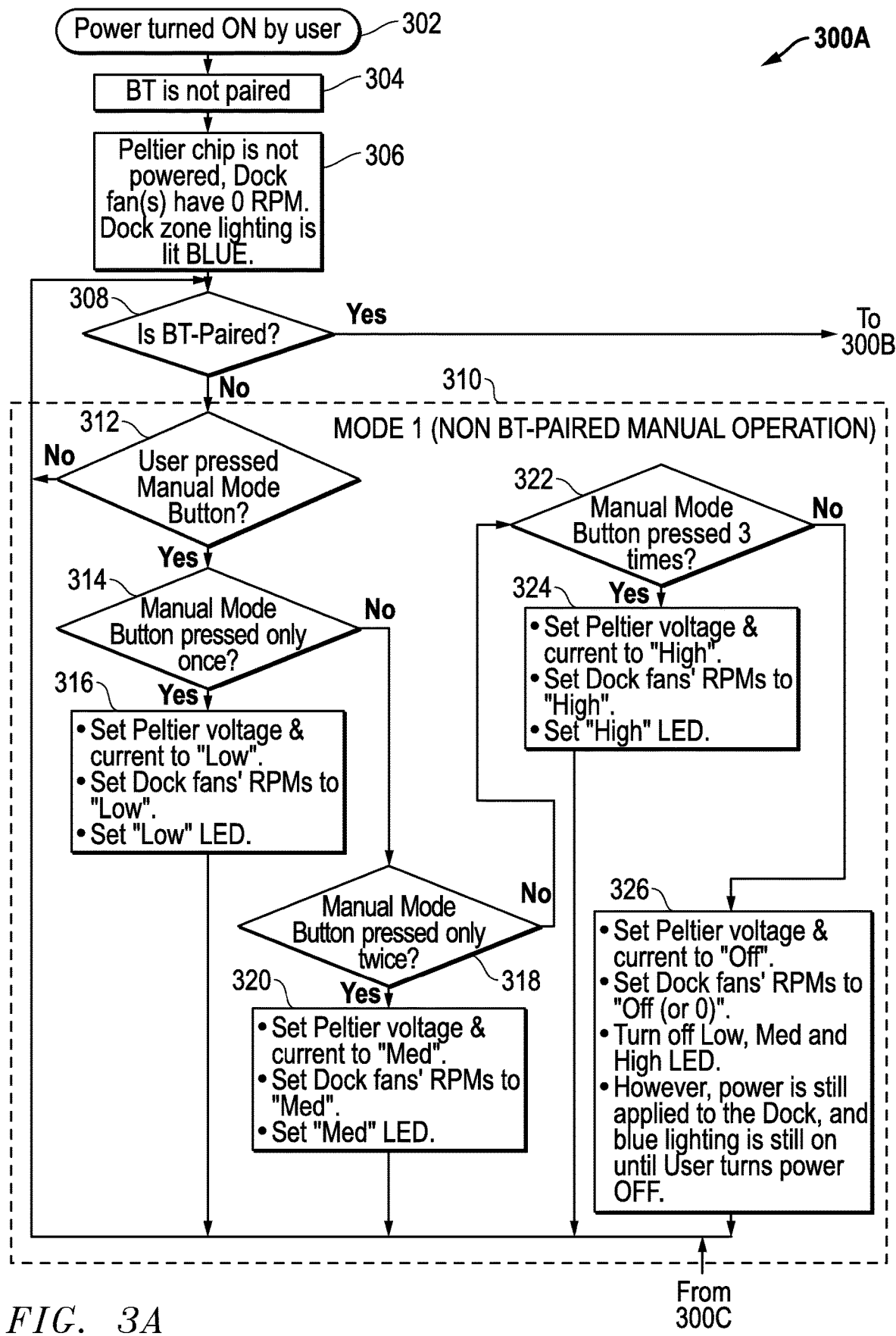
FIG. 3A illustrates methodology according one exemplary embodiment of the disclosed systems and methods.
Figure 3B:
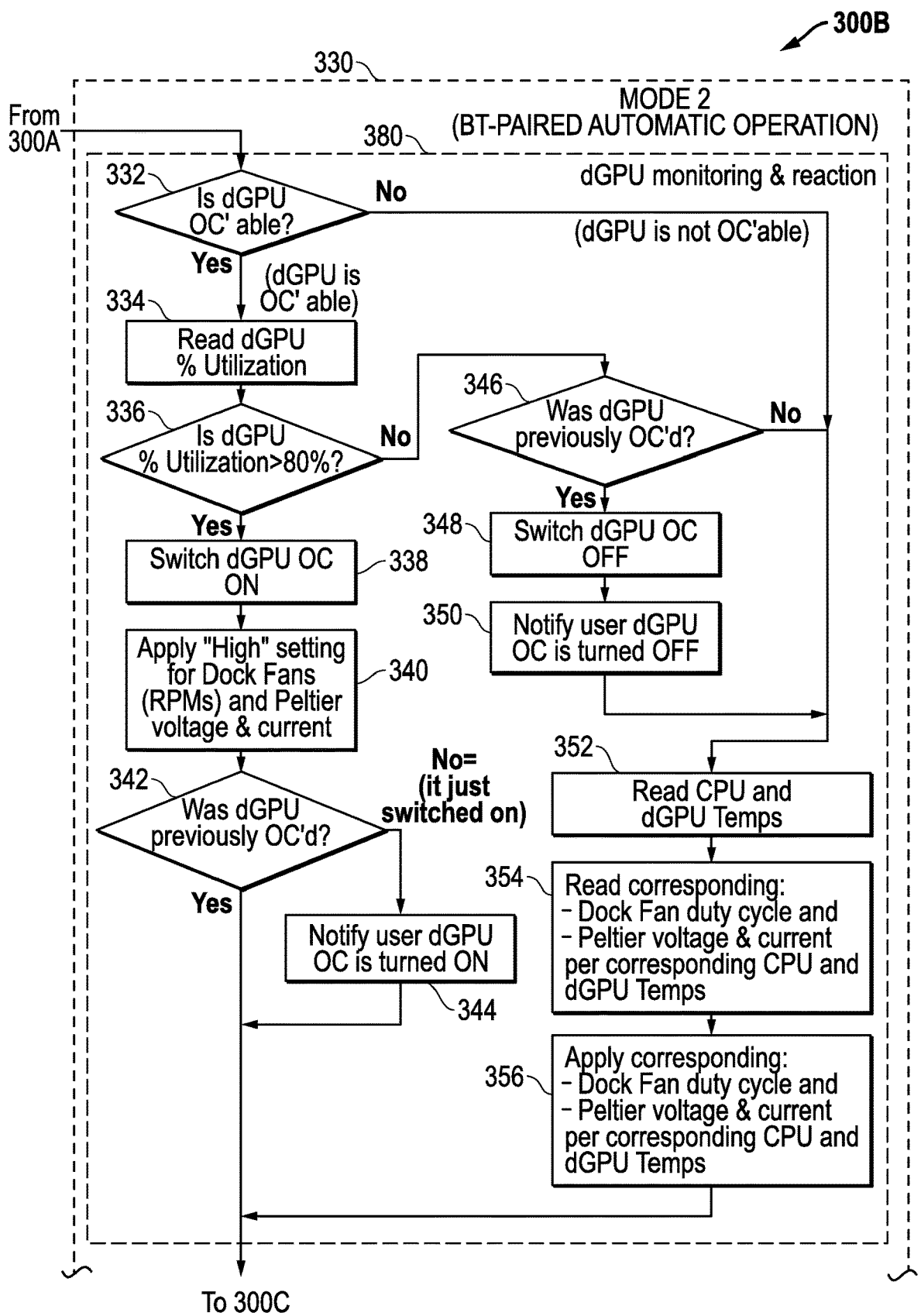
FIG. 3B illustrates methodology according one exemplary embodiment of the disclosed systems and methods.
Figure 3C:
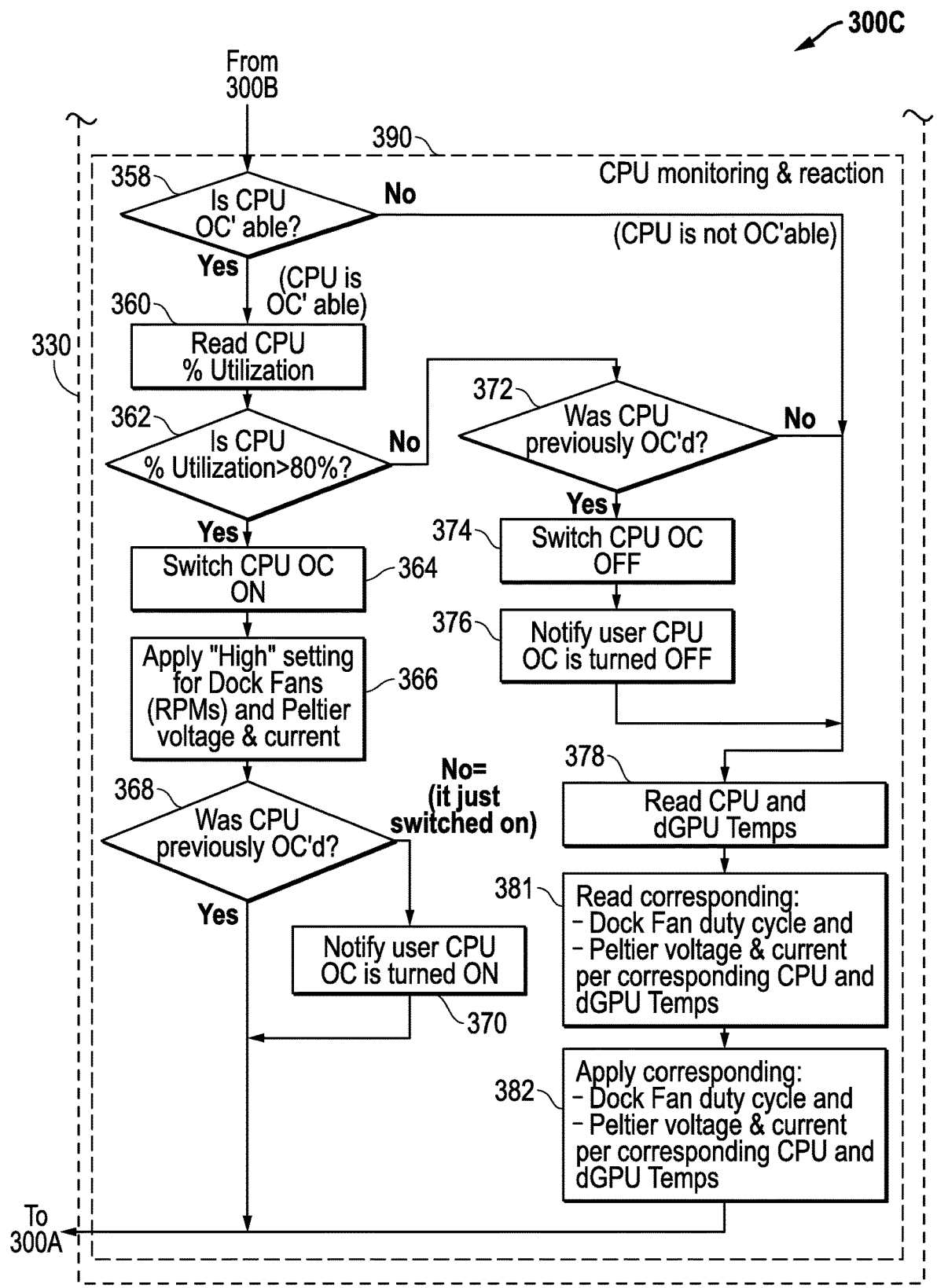
FIG. 3C illustrates methodology according one exemplary embodiment of the disclosed systems and methods.

FIGS. 3A-3C illustrate one exemplary embodiment of methodology 300 that may be implemented according to one exemplary embodiment of the disclosed systems and methods in which each of notebook computer 100 and cooling dock 180 are configured to communicate using wireless communication, in this case Bluetooth protocol communication although methodology 300 may be alternatively implemented using any other suitable wireless communication technology. As shown in FIGS. 3A-3C, methodology 900 starts in step 902, e.g., with the cooling dock 180 physically positioned adjacent a notebook computer 100 in the manner illustrated in FIG. 2.

As shown in FIG. 3A, methodology 300 begins in step 302 where power to the cooling dock 180 is turned on or cooling dock (or alternatively cooling dock controller 173 may be rebooted or returning from sleep mode after previous paired condition in step 302), and the following steps 306, 308, and Mode 1 (manual operation) routine 310 are performed by cooling dock firmware 134. Specifically, upon power up, respective Bluetooth radio modules of notebook computer 100 and cooling dock 180 are not yet paired as shown in step 304, and in step 306 chilling system 175 (e.g., Peltier cooling chip) is not powered on by default and dock cooling fans 178 and 278 are inactive (i.e., with 0 RPM) before Bluetooth pairing. Also at this time, a default startup lighting mode (e.g., color) may be set for optional LED driver 250 and RGB LEDs 252 if these components are present. It will be understood that even after power on and/or signal connection of cooling dock 180 to notebook computer 100 that CPU 105 and/or dGPU 120 may not be operating in overclock mode, i.e., in one embodiment overclocking modes of CPU 105 and/or dGPU 120 are not automatically initiated just because cooling dock 180 is powered on and coupled in communication with notebook computer 100, but rather CPU 105 and/or dGPU 120 overclocking mode states are intelligently controlled to be on or off based on real time sensed CPU 105 and/or dGPU 120 % processing device utilization and/or operating temperatures.

Methodology 300 then proceeds to step 308 where it is determined whether Bluetooth pairing has occurred yet. In one embodiment, pairing may be initiated by a user by pressing or activating a software switch on a cooling dock control GUI that is displayed on display 125 (and/or by pressing a hardware switch provided on the chassis cooling dock 180) to cause cooling dock 180 to broadcast its Bluetooth presence to initiate pairing. If so, then methodology 300 proceeds from step 308 to paired operation routine 330 described further herein. However, if docking system 180 and notebook 100 are not yet paired, then methodology 300 proceeds to step 312 of non-Bluetooth paired operation (Mode 1 operation) routine 310 where it is determined whether a user of notebook computer 100 and dock 180 has pressed the manual mode button 137 on cooling dock 180 at least once. If not, the methodology 300 returns to step 308 and repeats as shown. However, if manual mode button 137 is determined to have been pressed in step 312, then methodology 300 enters manual control mode and proceeds to steps 314, 318 and/or 322 where it is determined if the manual mode button 137 has been pressed once, twice or three times sequentially by a user upon and since entering step 312. Once the manual button 137 has been so pressed, then cooling dock controller 173 continues to the state of monitor manual button 137 as well as the cumulative number of times that manual button 137 has been pressed since methodology 300 first detected in step 312 that the manual button 137 has been pressed.

If manual mode button 137 has been pressed once, then methodology 300 proceeds from step 314 to step 316, where chilling system 175 is powered on and set to deliver a relatively low level of cooling, e.g., by setting Peltier chip current and voltage supply to a relatively lower predefined level (e.g. such as about 3 volts at 1.5 amps, and cooling dock fans 178 and 278 are set to operate at a relatively low speed (e.g., about 25-50% duty cycle). Also at this time, dock lighting mode (e.g., color) may be optionally set for optional LED driver 250 and RGB LEDs 252 to a relatively low illumination level and/or particular predefined color (e.g., blue) if these components are present. Methodology 300 returns to step 308 and repeats as shown.

If manual mode button 137 has been pressed twice, then methodology 300 proceeds from steps 314 and 318 to step 320, where chilling system 175 is powered on and set to deliver a relatively medium level of cooling, e.g., by setting Peltier chip current and voltage supply to a predefined mid-level (e.g. such as about 6 volts at 3 amps), and by setting cooling dock fans 178 and 278 to operate at a predefined mid-level speed (e.g., about 50-75% duty cycle). Also at this time, dock lighting mode (e.g., color) may be optionally set for optional LED driver 250 and RGB LEDs 252 to a relatively medium illumination level and/or another particular predefined color (e.g., green) if these components are present. Methodology 300 returns to step 308 and repeats as shown.

If manual mode button 137 has been pressed three times, then methodology 300 proceeds from steps 314, 318 and 322 to step 324, where chilling system 175 is powered on and set to deliver a relatively high level of cooling, e.g., by setting Peltier chip current and voltage supply to a predefined high level (e.g. such as from about 11 to 11.5 volts at 6 amps), and by setting cooling dock fans 178 and 278 to operate at a predefined high level speed (e.g., about 75-100% duty cycle). Also at this time, dock lighting mode (e.g., color) may be optionally set for optional LED driver 250 and RGB LEDs 252 to a relatively high illumination level and/or another particular predefined color (e.g., red) if these components are present. Methodology 300 returns to step 308 and repeats as shown. In a further embodiment, power to chilling system 175 and dock fans 178 and 278 may be turned off (i.e., rather than implementing one of steps 316, 320 and 324) if manual mode 137 is pressed a fourth time.

If manual mode button has been pressed more than 3 times consecutively (such as from a child experimenting if it can confuse the unit for fun), then methodology 300 proceeds from steps 314, 318 and 322 to step 326, where cooling dock 180 remains powered on, but chilling system 175 remains turned off and dock cooling fans 178 and 278 are inactive. Optional LED driver 250 is controlled to continue display default illumination of RGB LEDs 252 if these components are present. Methodology 300 returns to step 308 and repeats as shown.

Returning to step 308, whenever Bluetooth pairing between cooling dock 180 and notebook computer 100 is detected (initially at dock startup or anytime thereafter), then methodology 300 proceeds from step 308 to enter Mode 2 (automatic control operation) routine 330 illustrated in FIG. 3B, which is performed by cooling dock control Application 129 as executed by CPU 105. In this exemplary embodiment, Mode 2 routine 330 begins with dGPU monitoring and reaction sequence 380 that includes initial step 332 where it is determined by cooling dock control application 129 communicating with the dGPU 120 via an appropriate GPU API whether dGPU 120 is configured with overclocking capability. If so, then methodology 300 proceeds to step 334 where current real time dGPU utilization is read by cooling dock control application 129 through appropriate GPU API. Methodology 300 then proceeds to step 336 where it is determined by cooling dock control application 129 if the current real time dGPU utilization is greater than a upper threshold dGPU utilization value (e.g., 80% in this embodiment, although minimum dGPU threshold values that are less than or that are greater than 80% are also possible). If so, then dGPU overclocking is automatically switched on by cooling dock control application 129 via command sent to dGPU 120 in step 338, and cooling dock control application 129 instructs cooling dock firmware 134 to control chilling system 175 to deliver a relatively high level of cooling in step 340, e.g., by setting Peltier chip current and voltage supply to a predefined high level (e.g. such as from about 11 volts to about 11.5 volts, and about 6 amps), and by setting cooling dock fans 178 and 278 to operate at a predefined high level speed (e.g., from about 75%-100% PWM). In one exemplary embodiment, the predefined Peltier current and voltage high level may be the identical high cooling setting used in manual mode 324, as found in dock firmware 134 as executed by dock controller 173. In another exemplary embodiment, the Peltier current voltage, and cooling dock fan speed information may be output from the chilling system parameters from Table 1 found in the dock's firmware 134 as executed by dock controller 173.

After step 340, methodology 300 proceeds to step 342 where it is determined by cooling dock control application 129 whether dGPU 120 previous state was overclocked. If so, then methodology 300 proceeds to step 358 of CPU monitoring and reaction sequence 390 of FIG. 3C. If not, then the user may be notified in step 344 (e.g., by user message displayed on display 125 and/or status update in the cooling dock control application's 129 graphic user interface) that dGPU overclocking has been turned on, before methodology 300 proceeds to step 358 of CPU monitoring and reaction sequence 390 of FIG. 3C.

Returning to step 336 of FIG. 3B, if current real time dGPU utilization is not greater than the upper threshold dGPU utilization value, then this means a graphics intensive application is not in effect, and dGPU overclocking is not required for this work load. The cooling dock control application 129 determines in step 346 whether the previous status of dGPU 120 was in overclock mode. If so, then cooling dock control application 129 automatically switches off dGPU overclocking in step 348 and notifies the user (e.g., by user message displayed on display 125 and/or status update in the cooling dock control application's 129 graphic user interface) in step 350 that dGPU overclocking has been turned off. It will be understood that in an optional embodiment, cooling dock control application 129 may further optionally implement an additional step between steps 346 and 348 to determine if current real time dGPU utilization is less than a predefined lower threshold utilization value (e.g., such as 30% or 25%) that is lower than the upper threshold utilization value of step 336, and if so then proceed to step 348 and if not then proceed directly to step 352 in a similar manner as described further herein below without switching off dGPU overclocking.

When methodology 300 proceeds to step 352, cooling dock control application 129 (e.g., communicating to the system BIOS via an API for CPU readings and to the dGPU 120 via an API for dGPU readings) reads current real time CPU and dGPU operating temperatures and writes these to dock controller 173. In step 354, cooling dock firmware 134 in turn reads dock fan duty cycle values corresponding to current real time CPU and dGPU operating temperatures, as well as chilling system operation parameters (e.g., Peltier voltage and current) corresponding to current real time CPU and dGPU operating temperatures from look up table of cooling dock firmware 134 (e.g., such as illustrated in Table 1). Cooling dock firmware 134 then uses the read dock fan duty cycle values and chilling system operation parameters from step 354 to control speed of cooling dock fans 178 and 278 and cooling level of chilling system 175 accordingly in step 356 before proceeding to step 358 of CPU monitoring and reaction sequence 390 of FIG. 3C. It will be understood that in one alternate embodiment, steps 352 to 356 may be performed using real time internal notebook chassis temperature sensed by temperature sensor/s 114 and reported to or read by the cooling dock control application 129, rather than using the real time CPU and/or dGPU operating temperatures sensed by integrated temperature sensors 122 of dGPU 120 and CPU 105. In a further alternative embodiment, steps 352 to 356 may be performed using a combination of real time internal notebook chassis temperature sensed by temperature sensor/s 114 and real time CPU and/or dGPU operating temperatures sensed by integrated temperature sensors 122 of dGPU 120 and CPU 105.

Referring now to FIG. 3C, CPU monitoring and reaction sequence 390 begins with initial step 358 where it is determined by cooling dock control application 129 whether CPU 105 is configured with overclocking capability. If so, then methodology 300 proceeds to step 360 where current real time CPU utilization is read by cooling dock control application 129 through appropriate CPU API. Methodology 300 then proceeds to step 362 where it is determined by cooling dock control application 129 if the current real time CPU utilization is greater than a upper threshold CPU utilization value (e.g., 80% in this embodiment, although minimum CPU threshold values that are less than or that are greater than 80% are also possible). This indicates that a CPU intensive application is running and CPU overclocking would be a beneficial performance gain. If so, then CPU overclocking is switched on by cooling dock control application 129 via a command to the system BIOS via CPU API, in step 364, and cooling dock control application 129 instructs cooling dock firmware 134 to control chilling system 175 to deliver a relatively high level of cooling in step 366, e.g., by setting Peltier chip current and voltage supply to a predefined high level (e.g. such as from about 11 volts to about 11.5 volts, and about 6 amps), and by setting cooling dock fans 178 and 278 to operate at a predefined high level speed (i.e., from about 75%-100% PWM).

After step 366, methodology 300 proceeds to step 368 where it is determined by cooling dock control application 129 whether the previous state of CPU 105 was overclocked. If so, then methodology 300 returns to step 308 of FIG. 3A. If not, then the user may be notified in step 370 (e.g., by user message displayed on display 125 and/or via a status update found in cooling dock control application's 129 graphical user interface) that CPU overclocking has been turned on, before methodology 300 returns to step 308 of FIG. 3A.

Returning to step 362 of FIG. 3C, if current real time CPU utilization is not greater than the upper threshold CPU utilization value, indicating that a CPU intensive application is not being run by the computer 100 or other portable information handling system, then cooling dock control application 129 checks in step 372 whether the last known operating state of CPU 105 was in overclocked mode. If so, then cooling dock control application 129 switches off CPU overclocking in step 374 and notifies the user (e.g., by user message displayed on display 125 and/or via a status update in cooling dock control application's 129 graphical user interface) in step 376 that CPU overclocking has been turned off. It will be understood that in an optional embodiment, cooling dock control application 129 may further optionally implement an additional step between steps 372 and 374 to determine if current real time CPU utilization is less than a predefined lower threshold CPU utilization value (e.g., such as 30% or 25%) that is lower than the upper threshold utilization value of step 362, and if so then proceed to step 374 and if not then proceed directly to step 378 in a similar manner as described further herein below without switching off CPU overclocking.

When methodology 300 proceeds to step 378, cooling dock control application 129 reads current real time CPU and CPU operating temperatures via a CPU API to system BIOS and supplies these to dock controller 137. In step 381, cooling dock firmware 134 in turn reads dock fan duty cycle values corresponding to current real time CPU and CPU operating temperatures, as well as chilling system operation parameters (e.g., Peltier voltage and current) corresponding to current real time CPU and CPU operating temperatures from look up table of cooling dock firmware 134 (e.g., such as illustrated in Table 1). Cooling dock firmware 134 then uses the read dock fan duty cycle values and chilling system operation parameters from step 381 to control speed of cooling dock fans 178 and 278 and cooling level of chilling system 175 accordingly in step 382 before returning to step 308 of FIG. 3A.

In one exemplary embodiment, dock controller 173 may be configured to sense for and check to see if the chilling system 175 (e.g., Peltier chip) has failed during operation of paired automatic mode 2. For example, in one exemplary embodiment, a thermal sensor (such as sensor 194a and/or 194b) may report the supplemental cooling air temperature exiting the dock and entering into the air intake vent/s 161 of notebook or portable information handling system 100. In such an embodiment, if the thermal sensor 194a and/or 194b reports a supplemental cooling air temperature significantly higher than what is expected, this would indicate chilling system 175 (e.g., Peltier chip(s)) is no longer functioning as it should be and thus indicate a chilling system 175 failure. If chilling system 175 is detected to fail, then any automatically initiated CPU and/or dGPU overclocking of methodology 300 may be immediately disabled, the chilling system power may be switched off, the cooling dock fans may be controlled to run at maximum cooling speed and the user notified via a visual prompt on display 125 and/or audio alarm on speaker 119 that the chilling system has failed and that system manufacturer support personnel should be contacted. In another exemplary embodiment, dock controller 173 may be configured to sense for and check to see if the dock cooling fans 178 and/or 278 have failed during paired automatic mode 2, e.g., by sensing 4 wire fan interface to detect if the fans are moving. If cooling fans 178 and/or 278 are detected to have failed, then any automatically initiated CPU and/or dGPU overclocking of methodology 300 may be immediately disabled, the chilling system power may be switched off, and the user notified via a visual prompt on display 125 and/or audio alarm on speaker 119 that the dock cooling fan/s have failed and that manufacturer support should be contacted.

FIG. 4 is a look-up-table that may be incorporated in cooling control application 129 which may be used to control cooling dock operations and processing device speed or overclocking according to one exemplary embodiment. Under a variety of dock operation scenarios, FIG. 4 shows the applicable inputs and the resulting outputs. Possible inputs not shown in FIG. 4 include read inputs of chilled air temperature, CPU temperature and dGPU temperature. FIG. 4 shows that not only are inputs such as chilled air temperature, CPU temperature, CPU % utilization, dGPU temperature and dGPU % utilization read in, but they are also used to generate additional inputs as calculated by dock controller 173 to provide outputs to support a wide variety of dock use case scenarios. Unlike the FIGS. 3B and 3C that show support of multi-processor overclocking being enabled or disabled, FIG. 4 shows the ability to support multiple different processors or processing devices with varying levels of overclocking.

It will also be understood that FIGS. 2C and 3A-3C are exemplary only, and that fewer, additional and/or alternative steps may be performed in any order suitable using a cooling dock controller and chilling system to provide supplemental cooling for a portable information handling system (e.g., such as a notebook or laptop computer), with or without communication established between the cooling dock controller and a host processing device of the portable information handling system.

It will also be understood that one or more of the tasks, functions, or methodologies described herein (e.g., including those described herein for components 103, 105, 111, 120, 121, 133, 173, etc.) may be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program comprising instructions are configured when executed (e.g., executed on a processing device of an information handling system such as CPU, controller, microcontroller, processor, microprocessor, FPGA, ASIC, or other suitable processing device) to perform one or more steps of the methodologies disclosed herein. In one embodiment, such processing devices may be selected from the group consisting of CPU, controller, microcontroller, processor, microprocessor, FPGA, and ASIC. A computer program of instructions may be stored in or on the non-transitory computer-readable medium accessible by an information handling system for instructing the information handling system to execute the computer program of instructions. The computer program of instructions may include an ordered listing of executable instructions for implementing logical functions in the information handling system. The executable instructions may comprise a plurality of code segments operable to instruct the information handling system to perform the methodology disclosed herein. It will also be understood that one or more steps of the present methodologies may be employed in one or more code segments of the computer program. For example, a code segment executed by the information handling system may include one or more steps of the disclosed methodologies.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A cooling dock configured to dock with an information handling system, the cooling dock comprising:
   at least one cooling fan positioned in the cooling dock, the cooling fan supplying external supplemental cooling air from an outlet vent of the cooling dock to a cooling air inlet vent defined in a chassis enclosure of the information handling system when the cooling dock is docked with an information handling system;
   at least one cooler positioned within the cooling dock, the cooler cooling the external supplemental cooling air before it is provided to the chassis enclosure inlet vent; and
   at least one first processing device coupled to at least one of the cooling fan or cooler, the first processing device programmed to execute a computer program of instructions embodied in a non-transitory tangible computer readable medium to control at least one of the speed of the cooling fan or the temperature of the cooler;
   where the first processing device is wired or wirelessly coupled to receive real time values of existing processor utilization and/or overclock state from at least one second processing device located within the chassis enclosure of the information handling system when the cooling dock is in docked position with an information handling system; and
   where the first processing device is further programmed to determine and then control a temperature and/or flow rate of the supplemental cooling air based on the values of existing processor utilization and/or overclock state received from the second processing device.

2. The cooling dock of claim 1, where the first processing device is wired or wirelessly coupled to receive measured values of real time processing device operating temperature separate and in addition to the received real time values of existing processor utilization and/or overclock state from at least one second processing device located within the chassis enclosure of the information handling system when the cooling dock is in docked position with an information handling system, the first processing device being further programmed to determine and then control a temperature and/or flow rate of the supplemental cooling air based on the measured values of real time processing device chip operating temperature received from the second processing device.

3. The cooling dock of claim 1, where the first processing device is programmed to determine to decrease a temperature of the supplemental cooling air and/or increase the flow rate of the supplemental cooling air based on a real time value of existing processor utilization received from the second processing device that is greater than an upper threshold processor utilization value set at the factory or time of manufacture; and determine to increase a temperature of the supplemental cooling air and/or decrease the flow rate of the supplemental cooling air based on a real time value of existing processor utilization received from the second processing device that is less than or equal to the upper threshold processor utilization value.

4. The cooling dock of claim 2, where the first processing device is programmed to determine to decrease a temperature of the supplemental cooling air and/or increase the flow rate of the supplemental cooling air based on a relatively higher value of real time processing device operating temperature received from the second processing device; and to determine to increase a temperature of the supplemental cooling air and/or decrease the flow rate of the supplemental cooling air based on a relatively lower value of real time processing device operating temperature received from the second processing device.

5. The cooling dock of claim 1, further comprising an integral temperature sensor positioned to sense the temperature of the supplemental cooling air before the supplemental cooling air enters the chassis enclosure inlet vent and coupled to provide the real time sensed real time supplemental cooling air temperature to the first processing device; and where the first processing device is further programmed to report the sensed real time temperature of the supplemental cooling air to the at least one second processing device located within the chassis enclosure of the information handling system.

6. The cooling dock of claim 1, where the first processing device is further programmed to:
detect the presence or absence of communication with the second processing device;
automatically determine and then control the temperature and/or flow rate of the supplemental cooling air based on the values of existing processor utilization and/or overclock state received from the second processing device within the chassis enclosure of the information handling system when communication is detected to be present between the first processing device and second processing device to; and
control the temperature and/or flow rate of the supplemental cooling air in response to manual temperature and/or supplemental cooling air flow rate control input by a user to the first processing device when communication is detected to be absent between the first processing device and second processing device to.

7. The cooling dock of claim 1, where the first processing device is further programmed to determine and control a temperature of the supplemental cooling air based on the measured values of processor utilization and/or overclock state received from the second processing device.

8. The cooling dock of claim 1, where the cooler comprises at least one of a thermoelectric cooler (TEC), Peltier cooling device thermoelectric module (TEM), liquid/gas refrigeration system, evaporative cooling system, vapor compression refrigeration device, or absorption refrigeration device.

9. The cooling dock of claim 3, where the upper threshold processor utilization value is 80%.

10. A system, comprising:
an information handling system comprising a chassis enclosure containing at least one second processing device and at least one cooling air inlet vent defined in the chassis enclosure;
a cooling dock positioned in docking relationship with the information handling system, the cooling dock comprising:
at least one cooling fan positioned in the cooling dock, the cooling fan supplying external supplemental cooling air from an outlet vent of the cooling dock to the inlet vent defined in a chassis enclosure of the information handling system,
at least one cooler positioned within the cooling dock, the cooler cooling the external supplemental cooling air before it is provided to the chassis enclosure inlet vent, and
at least one first processing device coupled to at least one of the cooling fan or cooler, the first processing device programmed to execute a computer program of instructions embodied in a non-transitory tangible computer readable medium to control at least one of the speed of the cooling fan or the temperature of the cooler temperature;
where the first processing device is coupled in wired or wireless communication with the second processing device;
where the second processing device is programmed to execute a computer program of instructions embodied in a non-transitory tangible computer readable medium to provide information indicative of processor utilization or overclocking state mode of one or more processing devices within the chassis enclosure to the first processing device, where the information indicative of processor utilization or overclocking state mode comprises real time values of existing processor utilization as a percentage or fraction value of full processing device utilization and/or as either an on or an off mode of an existing overclock state read from the one or more processing devices; and
where the first processing device is programmed to determine and then control a temperature and/or flow rate of the supplemental cooling air based on the information received from the second information handling system processing device that is indicative of processor utilization or overclocking state mode of one or more processing devices within the chassis enclosure of the information handling system.

11. The system of claim 10, where the first processing device is wired or wirelessly coupled to communicate with at least one second processing device located within the chassis enclosure of the information handling system to receive information indicative of real time chip operating temperature of one more information handling system processing devices from the second processing device, the first processing device being further programmed to control a temperature and/or flow rate of the supplemental cooling air based on the real time operating temperature information received from the second processing device; where the information indicative of real time operating temperature of one more information handling system processing devices comprises measured values of real time processing device chip operating temperature measured by at least one temperature sensor integrated within a chip of the processing device.

12. The system of claim 10, where the first processing device is programmed to decrease a temperature of the supplemental cooling air and/or increase the flow rate of the supplemental cooling air based on information received from the second processing device that is indicative of a real time processor utilization value that is greater than an upper threshold processor utilization value set at the factory or time of manufacture and/or that is indicative of a relatively higher real time chip operating temperature value of a second processing device within the chassis enclosure; and to increase a temperature of the supplemental cooling air and/or decrease the flow rate of the supplemental cooling air based on information received from the second processing device that is indicative of a real time processor utilization value that is less than or equal to the upper threshold processor utilization value and/or that is indicative of a relatively lower real time operating temperature value of a second processing device within the chassis enclosure.

13. The system of claim 10, where the at least one second processing device comprises at least one of a host processing device executing an operating system (OS) for the information handling system, a discrete graphics processing unit (dGPU), or a combination thereof.

14. The system of claim 10, where the cooling dock further comprises an integral temperature sensor positioned to sense the temperature of the supplemental cooling air before the supplemental cooling air enters the chassis enclosure inlet vent and coupled to provide the real time sensed supplemental cooling air temperature to the dock control processing device; where the first processing device is further programmed to report the real time sensed temperature of the supplemental cooling air to the at least one second processing device located within the chassis enclosure of the information handling system; and where the second processing device is programmed to determine and then control a processing speed or overclocking state of at least one processing device within the chassis enclosure of the information handling system based at least in part on the reported real time sensed temperature of the supplemental cooling air.

15. The system of claim 14, where the second processing device is further programmed to:
  read a real time processor utilization value and a separate real time operating temperature value of at least one given processing device within the chassis enclosure of the information handling system, the real time processor utilization value being read from a register of the at least one given processing device and the real time operating temperature value being read from a temperature sensor integrated within the at least one given processing device; and
  then determine and control a processing speed or overclocking state of the given processing device within the chassis enclosure of the information handling system based at least in part on the read real time processor utilization and real time operating temperature of the given processing device within the chassis enclosure of the information handling system in combination with the reported real time sensed temperature of the supplemental cooling air.

16. The system of claim 14, where the second processing device comprises a host central processing unit (CPU), where the processor utilization value comprises a CPU utilization value, and where the host CPU is executing at least one software application to:
  read real time CPU operating temperature and/or real time CPU utilization value; and
  control overclocking state through an application programming interface (API) based at least in part on the reported real time sensed temperature of the supplemental cooling air.

17. The system of claim 10, where the second processing device is further programmed to:
  read a real time processor utilization value from a register of least one given processing device within the chassis enclosure of the information handling system, and then:
    enable an overclocking mode having a higher processor clock speed than a maximum allowable processor clock speed of the given processing device when the determined real time processor utilization value of the given processing device is greater than a predefined upper threshold processor utilization value; and
    disable the overclocking mode of the given processing device when the determined real time processor utilization value of the given processing device is less than or equal to the predefined upper threshold processor utilization value; and
    then communicate the current enabled or disabled status of the overclocking mode of the given processing device as the information indicative of overclocking state of the given processing device to the first processing device; and
  where the first processing device is programmed to then decrease a temperature of the supplemental cooling air and/or increase the flow rate of the supplemental cooling air based on information received from the second processing device indicating that the overclocking mode of the given processing device is enabled, and increase a temperature of the supplemental cooling air and/or decrease the flow rate of the supplemental cooling air based on information received from the second processing device indicating that the overclocking mode of the given processing device is disabled.

18. The system of claim 10, where the second processing device is programmed to execute a computer program of instructions embodied in a non-transitory tangible computer readable medium to provide information indicative of overclocking state mode of one or more processing devices within the chassis enclosure to the first processing device, where the information indicative of overclocking state mode comprises indication of either an on or off mode of an existing overclock state having a higher processor clock speed than a maximum allowable processor clock speed read from the one or more processing devices; and where the first processing device is programmed to determine and then control a temperature and/or flow rate of the supplemental cooling air based on the information received from the second information handling system processing device that is indicative of overclocking state mode of the one or more processing devices within the chassis enclosure of the information handling system.

19. The system of claim 10, where the second processing device is programmed to execute a computer program of instructions embodied in a non-transitory tangible computer readable medium to provide information indicative of processor utilization of one or more processing devices within the chassis enclosure to the first processing device, where the information indicative of processor utilization comprises real time values of existing processor utilization as a percentage or fraction value of full processing device utilization read from the one or more processing devices; and where the first processing device is programmed to determine and then control a temperature and/or flow rate of the supplemental cooling air based on the information received from the second information handling system processing device that is indicative of processor utilization of the one or more processing devices within the chassis enclosure of the information handling system.

20. A method of cooling an information handling system, comprising:
   positioning a cooling dock having at least one first processing device in docking relationship with an information handling system that includes a chassis enclosure containing at least one second processing device and at least one cooling air inlet vent defined in the chassis enclosure;
   supplying chilled external supplemental cooling air from a cooling fan of the cooling dock to the inlet vent defined in the chassis enclosure of the information handling system;
   using the at least one first processing device of the cooling dock to control at least one of the speed of the dock cooling fan or the temperature of the supplemental cooling air;
   providing information from the second processing device that is indicative of processor utilization or overclocking state mode of one or more processing devices within the chassis enclosure of the information handling system to the dock control processing device, where the information indicative of processor utilization or overclocking state mode comprises real time values of existing processor utilization as a percentage or fraction value and/or as either an on or an off mode of an existing overclock state having a higher processor clock speed than a maximum allowable processor clock speed read from the one or more processing devices; and
   using the first processing device to determine and then control a temperature and/or flow rate of the supplemental cooling air based on the information received from the second processing device that is indicative of processor utilization or overclocking state mode of one or more processing devices within the chassis enclosure of the information handling system.

21. The method of claim 20, further comprising using the first processing device to control a temperature and/or flow rate of the supplemental cooling air based on information indicative of real time operating temperature of one or more second processing devices that is received from the information handling system processing device; where the information indicative of real time operating temperature of one more information handling system processing devices comprises measured values of real time processing device chip operating temperature measured by at least one temperature sensor integrated within each chip of the processing devices.

22. The method of claim 20, further comprising using the first processing device to decrease a temperature of the supplemental cooling air and/or increase the flow rate of the supplemental cooling air based on information received from the second processing device that is indicative of a real time processor utilization value that is greater than an upper threshold processor utilization value set at the factory or time of manufacture; and to increase a temperature of the supplemental cooling air and/or decrease the flow rate of the supplemental cooling air based on information received from the second processing device that is indicative of a real time processor utilization value that is less than or equal to the upper threshold processor utilization value.

23. The method of claim 20, further comprising using the first processing device to determine to decrease a temperature of the supplemental cooling air and/or increase the flow rate of the supplemental cooling air based on a relatively higher value of real time processing device operating temperature received from the second processing device; and to determine to increase a temperature of the supplemental cooling air and/or decrease the flow rate of the supplemental cooling air based on a relatively lower value of real time processing device operating temperature received from the second processing device.

24. The method of claim 20, further comprising:
   sensing a real time temperature of the supplemental cooling air before the supplemental cooling air enters the chassis enclosure inlet vent;
   providing the real time sensed supplemental cooling air temperature to the first processing device;
   using the first processing device to report the real time sensed temperature of the supplemental cooling air to the at least one second processing device located within the chassis enclosure of the information handling system; and
   using the second processing device to determine and then control a processing speed or overclocking state mode of at least one processing device within the chassis enclosure of the information handling system based at least in part on the reported real time sensed temperature of the supplemental cooling air.

25. The method of claim 24, further comprising using the second processing device to:
   read a real time processor utilization value and a separate real time operating temperature value of at least one given processing device within the chassis enclosure of the information handling system, the real time processor utilization value being read from a register of the at least one given processing device and the real time operating temperature value being read from a temperature sensor integrated within the at least one given processing device; and
   then determine and control a processing speed or overclocking state mode of the given processing device within the chassis enclosure of the information handling system based at least in part on the read real time processor utilization and real time operating temperature of the given processing device within the chassis enclosure of the information handling system in combination with the reported real time sensed temperature of the supplemental cooling air.

26. The method of claim 20, further comprising using the second processing device to:
   read a real time processor utilization value from a register of least one given processing device within the chassis enclosure of the information handling system, and then:
     enable an overclocking mode having a higher processor clock speed than a maximum allowable processor clock speed of the given processing device when the determined real time processor utilization value of the given processing device is greater than a predefined upper threshold processor utilization value; and
     disable the overclocking mode of the given processing device when the determined real time processor utilization value of the given processing device is less than or equal to the predefined upper threshold processor utilization value; and
     then communicate the current enabled or disabled status of the overclocking mode of the given processing device as the information indicative of overclocking state mode of the given processing device to the first processing device; and where the method further comprises then using the first processing device to then decrease a temperature of the supplemental cooling air and/or increase the flow rate of the supplemental cooling air based on information received from the second processing device indicating that the overclocking mode of the given processing device is enabled, and increase a temperature of the supplemental cooling air and/or decrease the flow rate of the supplemental cooling air based on information received from the second processing device indicating that the overclocking mode of the given processing device is disabled.

27. The method of claim 20, further comprising using the first processing device to:

detect the presence or absence of the communication with the second processing device;

automatically control the temperature and/or flow rate of the supplemental cooling air based on the information received from the second processing device that is indicative of processor utilization or overclocking state mode of one or more processing devices within the chassis enclosure of the information handling system when communication is detected to be present between the first processing device and second processing device; and control the temperature and/or flow rate of the supplemental cooling air in response to manual control input by a user to the first processing device when communication is detected to be absent between the first processing device and second processing device.

28. The method of claim 20, further comprising providing information from the second processing device that is indicative of overclocking state mode of one or more processing devices within the chassis enclosure of the information handling system to the dock control processing device, where the information indicative of overclocking state mode comprises indication of either an on or off mode of an existing overclock state having a higher processor clock speed than a maximum allowable processor clock speed read from the one or more processing devices; and using the first processing device to determine and then control a temperature and/or flow rate of the supplemental cooling air based on the information received from the second processing device that is indicative of the existing overclocking state mode of the one or more processing devices within the chassis enclosure of the information handling system.

29. The method of claim 20, further comprising providing information from the second processing device that is indicative of processor utilization of one or more processing devices within the chassis enclosure of the information handling system to the dock control processing device, where the information indicative of processor utilization comprises real time values of existing processor utilization as a percentage or fraction value read from the one or more processing devices; and using the first processing device to determine and then control a temperature and/or flow rate of the supplemental cooling air based on the information received from the second processing device that is indicative of processor utilization of the one or more processing devices within the chassis enclosure of the information handling system.

30. An information handling system, comprising:

a chassis enclosure containing at least one information handling system processing device and at least one cooling air inlet vent defined in the chassis enclosure, the at least one second processing device comprising at least one of a host processor executing an operating system (OS) for the information handling system, a discrete graphics processing unit (dGPU), or a combination thereof;

where the information handling system processing device located within the chassis enclosure of the information handling system is configured to be wired or wirelessly coupled to communicate with at least one first processing device of a cooling dock when it is positioned in docking relationship with the information handling system to supply external supplemental cooling air to the cooling air inlet vent defined in the chassis enclosure of the information handling system; and where the information handling system processing device is programmed to read and then provide information indicative of processor utilization or overclocking state mode of one or more processing devices within the chassis enclosure of the information handling system to the first processing device, where the information indicative of processor utilization or overclocking state mode comprise real time values of existing processor utilization and/or as either an on or an off mode of an existing overclock state having a higher processor clock speed than a maximum allowable processor clock speed read from the one or more processing devices.

31. The information handling system of claim 30, where the at least one second processing device is programmed to receive a real time sensed temperature value of the supplemental cooling air provided from the first processing device; and where the information handling system processing device is further programmed to determine and then control a processing speed or overclocking state mode of at least one processing device within the chassis enclosure of the information handling system based at least in part on the reported real time sensed temperature of the supplemental cooling air.

32. The information handling system of claim 31, where the second processing device is further configured to read a real time processor utilization and a separate real time operating temperature value of at least one given processing device within the chassis enclosure of the information handling system, the real time processor utilization value being read from a register of the at least one given processing device and the real time operating temperature value being read from a temperature sensor integrated within the at least one given processing device; and then determine and control a processing speed or overclocking state mode of the given processing device within the chassis enclosure of the information handling system based at least in part on the read real time processor utilization and real time operating temperature of the given processing device within the chassis enclosure of the information handling system in combination with the reported real time sensed temperature of the supplemental cooling air.

33. The information handling system of claim 30, where the second processing device is further configured to:

read a real time processor utilization value from a register of least one given processing device within the chassis enclosure of the information handling system, and then:

enable overclocking mode of the given processing device when the determined real time processor utilization value of the given processing device is greater than a predefined upper threshold processor utilization value; and disable overclocking mode of the given processing device when the determined real time processor utilization value of the given processing device is less than or equal to the predefined upper threshold processor utilization value; and then communicate the current enabled or disabled status of the overclocking mode of the given processing device as the information indicative of overclocking state mode of the given processing device to the first processing device.

34. The information handling system of claim 32, where the upper threshold processor utilization value is 80%.

* * * * *